United States Patent
Zheng et al.

(10) Patent No.: US 11,270,511 B2
(45) Date of Patent: Mar. 8, 2022

(54) METHOD, APPARATUS, DEVICE AND STORAGE MEDIUM FOR IMPLEMENTING AUGMENTED REALITY SCENE

(71) Applicant: TENCENT TECHNOLOGY (SHENZHEN) COMPANY LTD, Guangdong (CN)

(72) Inventors: Bo Zheng, Shenzhen (CN); Ri Jia Liu, Shenzhen (CN); Zhi Bin Liu, Shenzhen (CN); Qian Chen, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 0 days.

(21) Appl. No.: 16/677,047

(22) Filed: Nov. 7, 2019

(65) Prior Publication Data

US 2020/0074743 A1 Mar. 5, 2020

Related U.S. Application Data

(63) Continuation of application No. PCT/CN2018/114177, filed on Nov. 6, 2018.

(30) Foreign Application Priority Data

Nov. 28, 2017 (CN) .......................... 201711216327.2

(51) Int. Cl.
*G06T 19/00* (2011.01)
*G06T 7/70* (2017.01)
(Continued)

(52) U.S. Cl.
CPC .......... *G06T 19/006* (2013.01); *G01B 11/002* (2013.01); *G01P 13/00* (2013.01);
(Continued)

(58) Field of Classification Search
CPC ......... G06T 19/006; G06T 7/70; G06T 15/20; G06T 7/73; G06T 19/00; G01B 11/002;
(Continued)

(56) References Cited

U.S. PATENT DOCUMENTS

2015/0206339 A1\* 7/2015 Chun .................... G06T 15/205
345/419
2015/0310666 A1\* 10/2015 Meier .................... G06T 15/00
345/420
(Continued)

FOREIGN PATENT DOCUMENTS

| CN | 106056663 A | 10/2016 |
| CN | 106097435 A | 11/2016 |
| CN | 107168532 A | 9/2017 |

OTHER PUBLICATIONS

Machine translation of CN1071658532A (Wuhan Show Baby Software Co, Ltd Sep. 15, 2017 (Year: 2017).\*
(Continued)

*Primary Examiner* — Kee M Tung
*Assistant Examiner* — Khoa Vu
(74) *Attorney, Agent, or Firm* — Sughrue Mion, PLLC

(57) ABSTRACT

A method, an apparatus, a device, and a storage medium for implementing an augmented reality scene. The method including obtaining movement sensing data of a target object acquired by a positioning apparatus, determining, according to the movement sensing data, space motion information of the target object in the target site area and updating, according to the space motion information, an object model of the target object in a three-dimensional scene model corresponding to the target site area, determining an object position of the updated object model in a target area, the target area being an area determined in the three-dimensional scene model according to position information and field of view information of the display device in the
(Continued)

target site area, and displaying virtual information on the display device according to the object position.

16 Claims, 10 Drawing Sheets

(51) Int. Cl.
    *G01B 11/00*     (2006.01)
    *G01P 13/00*     (2006.01)
    *G06F 3/01*     (2006.01)
    *G06K 9/00*     (2006.01)
    *G06T 15/20*     (2011.01)

(52) U.S. Cl.
    CPC .......... *G06F 3/012* (2013.01); *G06K 9/00671* (2013.01); *G06T 7/70* (2017.01); *G06T 15/20* (2013.01)

(58) Field of Classification Search
    CPC .......... G01P 13/00; G06F 3/012; G06F 3/011; G06K 9/00671
    See application file for complete search history.

(56) References Cited

U.S. PATENT DOCUMENTS

| | | |
|---|---|---|
| 2016/0187969 A1 | 6/2016 | Larsen et al. |
| 2016/0261300 A1* | 9/2016 | Fei ........................ G06F 3/017 |
| 2017/0098312 A1* | 4/2017 | Souchard ............. H04N 13/221 |
| 2017/0193706 A1* | 7/2017 | Lo ........................ G06F 3/0304 |
| 2017/0221272 A1* | 8/2017 | Li ........................... G06T 7/248 |
| 2017/0270711 A1* | 9/2017 | Schoenberg ............. G06T 7/20 |
| 2018/0089616 A1* | 3/2018 | Jacobus ............... G05D 1/0274 |
| 2018/0150969 A1* | 5/2018 | Niwayama ............... G06T 7/73 |
| 2019/0158777 A1* | 5/2019 | Mann ..................... H04N 5/917 |
| 2019/0220002 A1* | 7/2019 | Huang ..................... G06T 7/70 |
| 2020/0151965 A1* | 5/2020 | Forbes ................. G06T 19/006 |

OTHER PUBLICATIONS

International Search Report for PCT/CN2018/114177 dated Feb. 12, 2019 [PCT/ISA/210].

* cited by examiner

METHOD, APPARATUS, DEVICE AND STORAGE MEDIUM FOR IMPLEMENTING AUGMENTED REALITY SCENE

CROSS-REFERENCE TO RELATED APPLICATIONS

This application is a continuation of International Patent Application No. PCT/CN2018/114177 filed on Nov. 6, 2018, which claims priority from Chinese Patent Application No. 201711216327.2, filed in the Chinese Patent Office on Nov. 28, 2017, and entitled "METHOD, APPARATUS, DEVICE AND STORAGE MEDIUM FOR IMPLEMENTING AUGMENTED REALITY SCENE", which are incorporated herein by reference in their entireties.

BACKGROUND

1. Field

Embodiments of the present disclosure relate to the field of augmented reality technologies, and in particular, to a method, an apparatus, a device and a storage medium for implementing an augmented reality scene.

2. Description of Related Art

Augmented Reality (AR) is a technology that combines relevant information of the real world and virtual information to build an augmented reality scene and represents the augmented reality scene to users. The AR technology may superimpose, based on a specific spatial area in the real world, a real scene and virtual information into a same space image to be sensed by sense organs of AR users, thereby implementing sensory experience beyond reality.

SUMMARY

Embodiments of the present disclosure provide a method, an apparatus, a device and a storage medium for implementing an augmented reality scene, and may generate virtual information in the augmented reality scene based on sensing movement of an object.

According to an embodiment, there is provided a method for implementing an augmented reality scene, executed by a computing device, the method including obtaining movement sensing data of a target object acquired by a positioning apparatus, the positioning apparatus being configured to monitor the target object in a target site area; determining, based on the movement sensing data, space motion information of the target object in the target site area; updating, based on the space motion information, an object model of the target object in a three-dimensional scene model corresponding to the target site area to obtain a first updated object model of the target object; and determining an object position of the first updated object model in a target area to display, on a display device, virtual information according to the object position, the target area being an area determined in the three-dimensional scene model based on position information and field of view information of the display device in the target site area.

According to another embodiment, there is provided a method for implementing an augmented reality scene, executed by a display device, the method including obtaining position information and field of view information of the display device in a target site area, the display device being configured to display virtual information of the augmented reality scene; generating orientation indication information based on the position information and the field of view information, and transmitting the orientation indication information to an augmented reality processing device, the orientation indication information instructing the augmented reality processing device to generate the virtual information to be displayed in a user field of view determined by the position information and the field of view information; and receiving a display message carrying the virtual information, from the augmented reality processing device, and displaying the virtual information based on the display message, the display message instructing the display device to overlay-display the virtual information in the user field of view.

According to another embodiment, there is provided an augmented reality display device, including at least one memory configured to store computer program code; and at least one processor configured to access the computer program code and operate as instructed by the computer program code, the computer program code including obtaining code configured to cause the at least one processor to obtain movement sensing data of a target object acquired by a positioning apparatus, the positioning apparatus being configured to monitor the target object in a target site area; model update code configured to cause the at least one processor to determine, based on the movement sensing data, space motion information of the target object in the target site area, and update, based on the space motion information, an object model of the target object in a three-dimensional scene model corresponding to the target site area to obtain a first updated object model of the target object; determining code configured to cause the at least one processor to determine an object position of the first updated object model in a target area, the target area being an area determined in the three-dimensional scene model according to position information and field of view information of the display device in the target site area; and display code configured to cause the at least one processor to display virtual information on the augmented reality display device according to the object position.

BRIEF DESCRIPTION OF THE DRAWINGS

To describe the technical solutions in the embodiments of the present disclosure more clearly, the following are described with reference to the accompanying drawings. Apparently, the accompanying drawings in the following description show merely some embodiments of the present disclosure, and a person of ordinary skill in the art may still derive other embodiments from these accompanying drawings without creative efforts.

DESCRIPTION OF EMBODIMENTS

Figure 1A:
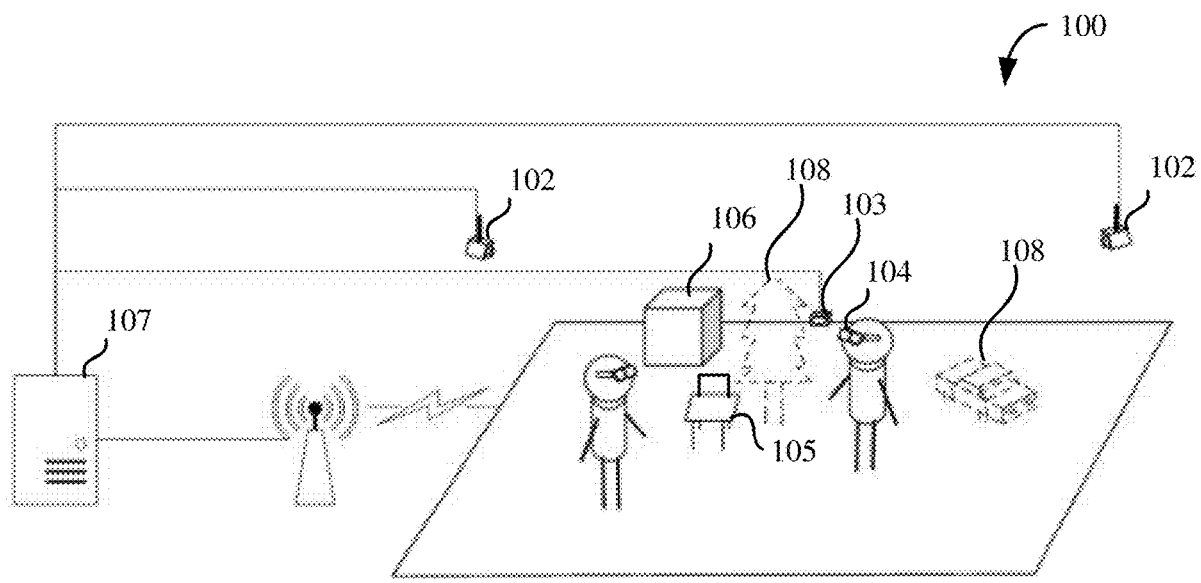
FIG. 1a is a schematic diagram of a scene construction according to an embodiment.

In the current implementation of the AR technology, an environment image may be captured by using a camera. A position in which virtual information is required to be overlaid may be recognized in the image and virtual information may be generated and overlaid in the captured image. An AR processing device is required to have good instant image recognition performance and is also required to recognize an image currently captured by the camera in real-time. As such, high-end software and hardware resources are consumed to complete AR processing.

According to embodiments of the present disclosure, one or more scene areas may be predisposed. A various scene props may be disposed in each area. For example, when a park scene area is disposed, objects such as flower stands, sculptures of various shapes, tables, and chairs may be disposed in the park scene area. In the disposed area, based on a shape of each object in an actual area in the real world and a position in the scene thereof, a virtual three-dimensional scene model corresponding to the area may be generated, and the virtual three-dimensional scene model may be used to completely represent shapes and positions of objects in an entire area.

An AR user may use a display device to move in the area in the real word. The display device may be a pair of AR glasses with transparent display screens. On one hand, the user may directly observe some areas in the area in the real word by using the AR glasses. On the other hand, the AR glasses may display virtual information which needs to be displayed. As such, the user may view the virtual information when observing the area. For example, when actually viewing a tree in the area by using the AR glasses, the user may also view some overlaid virtual information about the tree, and the virtual information may be information such as a name, an attribute, and a source of the tree. In the moving process of the user wearing the AR glasses, when a position of the AR glasses in the area scene and a field of view of the AR glasses are known, a user field of view in this case may be calculated. When the position of the AR glasses in the area scene, and the calculated view range of the user are combined with the three-dimensional scene model, a particular range of view may be determined so that the user wearing the AR processing device may view an object in a particular range of view, and then virtual information required to be overlaid may be generated. The generated virtual information and a three-dimensional space model of the object may be calculated to determine a position where the virtual information should be displayed. The generated virtual information may be virtual information that should be displayed and that is found, or may be virtual information that is obtained after being further processed based on virtual information that has been found and that has been displayed.

According to an embodiment, when the virtual information is information such as text that can be displayed directly on the AR glasses, a display position of the virtual information may be calculated based on an object model corresponding to an object in the view range of the user, and the AR glasses directly displays the virtual information on the calculated display position. For example, if the virtual information about the tree needs to be displayed on a trunk, and a display position of the virtual information on the AR glasses needs to be calculated based on a position of the trunk in an object model of the tree in a view range of the user, the AR glasses displays the virtual information at the position of the trunk.

Furthermore, if the virtual information is a virtual image, it needs to be determined whether the virtual image is blocked by an object in the area in the view range of the user. Based on the object model corresponding to the object in the view range of the user, the display position where the virtual image should be displayed, and a shape of the virtual image, it needs to determine the area in which the virtual image may be displayed. For example, the virtual image may be displayed in some areas and may not be displayed in other areas. The AR glasses may display the virtual image in only some areas. For example, a virtual street lamp may need to be displayed to the user. In this case, some areas that are blocked by a desk and a tree in the virtual street lamp may need to be removed based on object models corresponding to the desk and the tree in the view range of the user, and a street lamp image corresponding to some unblocked areas is obtained and displayed.

According to an embodiment, the AR glasses may only display virtual information. A dedicated AR processing device, which may be a computing device such as a server, may be configured to calculate a three-dimensional scene model in the site area. Based on a field of view of a position of the AR glasses, a user field of view and processing of the virtual information may be calculated. The server may transmit the generated virtual information carried in a display message to the AR glasses, and the AR glasses may display the virtual information on a corresponding display position based on the virtual information and an indication of the display position in the display message. In this way, in the user field of view, the virtual information may be seen in a corresponding position. For example, virtual information of the tree may be seen on the trunk of the tree, and the virtual image of a street light behind the table may be seen. Further, there may be a plurality of site areas. In such case, the site area where the AR user is currently located may be determined as a target scene area based on a position of the AR glasses.

FIG. 1a is a schematic diagram of a scene construction according to an embodiment. The AR glasses 104 may provide an augmented reality service to the user only in an interactive range of a target site area 100 where the user is currently located, and an interaction between the user and AR may be effective only in the interactive range of the target site area 100. A distance sensor 102 in the target site area 100 may be preset. There may be a plurality of the distance sensors 102, and these distance sensors 102 may locate a fixed object 106, a moving object and a person in the target site area 100 by means of echo, reflected light, or radio signal ranging in combination with positions of the distance sensor 102 and a matching receiver thereof. A specific position algorithm may be a triangulation position algorithm. A ground assisted positioning device 103 may also disposed in the target site area 100. The ground assisted positioning device 103 may scan and detect an area at a particular distance from the ground by using a laser array, to process objects and details which may be blocked. The ground assisted positioning device 103 is mainly configured to avoid a problem of inaccurate positioning of an object caused by that the distance sensor 102 in which the distance sensor 102 cannot accurately sense the position data of the object that is close to a ground area or some areas of the object, for example, some areas under a stool bottom of a stool. The AR glasses 104 is a wearable display. The AR glasses 104 may interact with an AR processing device 107 by radio signals, transmit an image required to be displayed, and transmit the position and a rotating angle of the AR glasses 104, so as to determine position information and field of view information of the display device in the target site area 100.

The target site area 100 may include a target object 105. The target object 105 may be any moving object in the target site area 100, for example, a movable chair and the like. The position of the target object 105 may be determined by the distance sensor 102, and a positioning sensor such as an acceleration sensor may be built in the object to improve the accuracy of calculating the position of such object. A plurality of positioning sensors such as acceleration sensors may be disposed on different areas of the target object 105, so as to accurately locate a position of the entire target object 105 in the target site area 100. The positioning data may be transmitted to the AR processing device 107 by radio. A position and a shape of a fixed object 106 in the target site area 100 may be determined in advance. A detailed position and a three-dimensional model of the fixed object 106 may be pre-recorded in a stored scene database, to ensure that the server may effectively construct the same interactive space as the real physical space when interacting with the user.

Figure 1B:
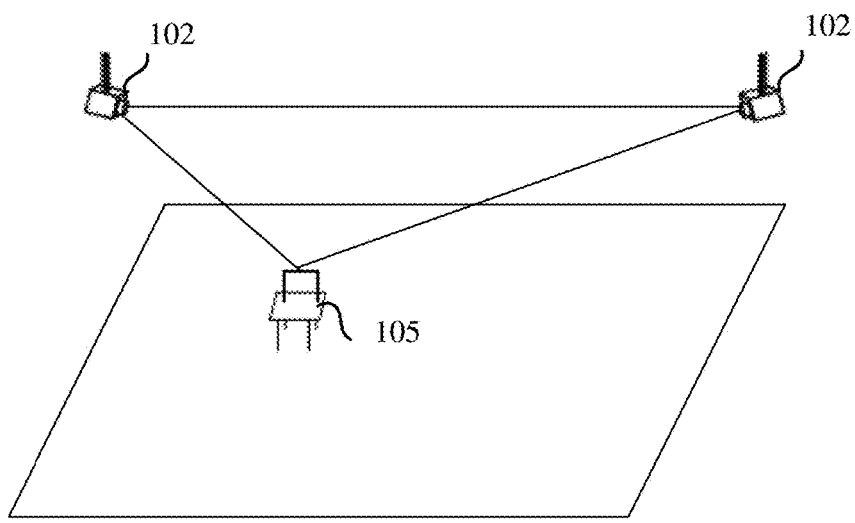
FIG. 1b is a schematic diagram of a sensing method of movement sensing data according to an embodiment.

Furthermore, in the target site area 100, the fixed object 106 or a moving object may be a rigid object, and the positioning device may monitor the entire object. FIG. 1b is a schematic diagram showing that the target object 105 is monitored as a rigid object to obtain movement sensing data. It is assumed that parts of a chair as the target object 105 are fixedly connected to each other, and components do not move relative to each other. The structure and shape of the target object 105 as a rigid object do not change with the movement of the object. The positioning device may monitor a position and/or a rotating angle of one point in a moving object, to obtain the movement sensing data of the entire object, facilitating determining the position and the rotating angle of the target object 105 based on the detected movement sensing data. The position device may update the position of the target object 105 through an overall movement and/or a rotation of the object model corresponding to the moving object.

Figure 1C:
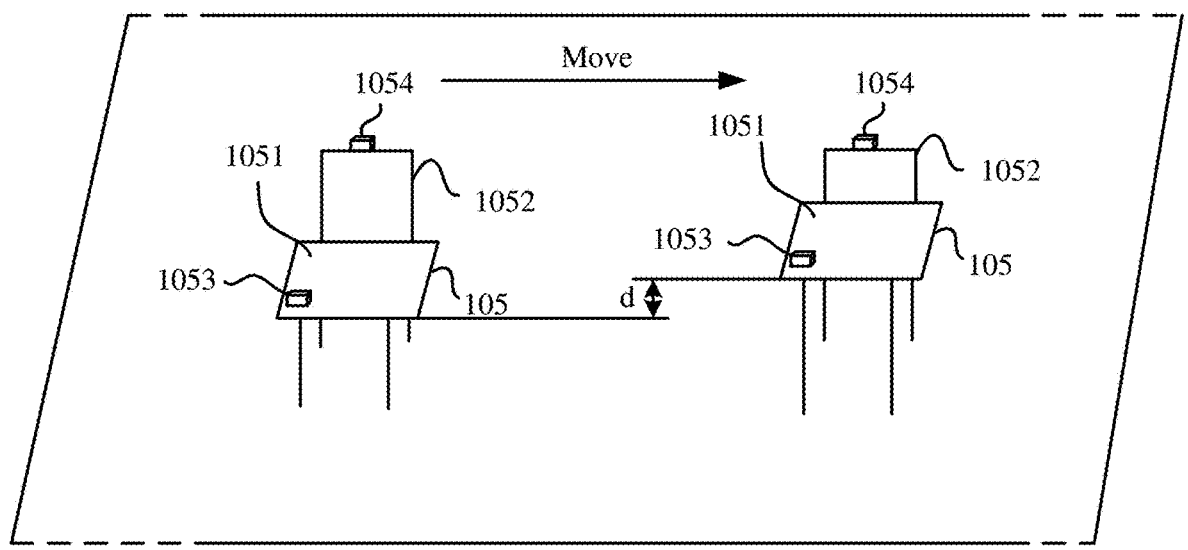
FIG. 1c is another schematic diagram of a sensing method of movement sensing data according to an embodiment.

In contrast, the moving object in the target site area 100 may be flexible. In this case, the sensing data of the moving object may be determined in two manners. First, a positioning sensor may be disposed in a key part of the target object 105, for example, the positioning sensor such as an acceleration sensor, or a gyroscope may be disposed. Movement sensing data such as the position and the rotating angle in the corresponding area of the key part may be accurately obtained by using these positioning sensors disposed in the key part. As shown in FIG. 1c, it is assumed that the chair as the target object 105 is a chair with a seat surface 1501 that may be raised and lowered. As such, an acceleration sensor 1053 may be disposed on the seat surface 1051 and an acceleration sensor 1054 may be disposed on a back 1052. When the target object 105 is horizontally moved while raising the seating surface 1051 based on the distance d, the two sensors can respectively sense the two movement sensing data. Subsequently, based on the two movement sensing data, the spatial position of the entire target object 105 after being moved and transformed may be obtained. However, FIG. 1c is only an example.

Figure 1D:
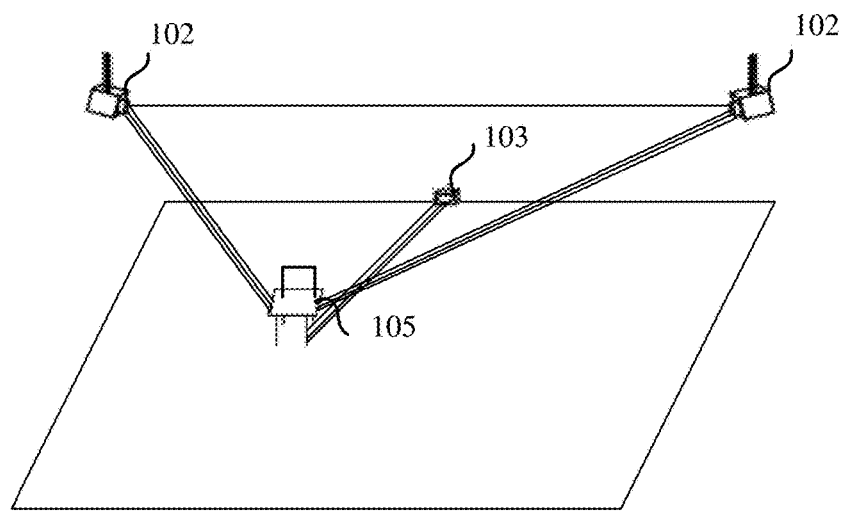
FIG. 1d is still another schematic diagram of a sensing method of movement sensing data according to an embodiment.

Second, movement sensing data such as movement position of each part of the entire target object 105 after movement may be directly scanned by using ranging sensor of array type such as a laser ranging array, an infrared ranging array or an ultrasonic ranging array. As shown in FIG. 1d, the chair as the target object 105 is a transformable object. For example, the chair has a plurality of components that may move between each other. In FIG. 1d, the distance sensor 102 such as the laser ranging array may obtain movement sensing data for the target object 105 in an array scan manner. Subsequently, based on the movement sensing data and the triangulation positioning algorithm, positions of a plurality of position points of the target object 105 in the target site area 100 may be determined. In FIG. 1d, to ensure that some parts such as the bottom part, which is not easily scanned by the distance sensor 102, the ground assisted positioning device 103 may also obtain the movement sensing data. The data of the distance sensor 102 is supplemented to more accurately obtain the movement sensing data of most position points on the movable target object 105, facilitating the subsequent update of the object model of the entire target object 105. It should be noted that, the arrays emitted by the distance sensor 102 and the ground assisted positioning device 103 in FIG. 1d are used as an example. In an actual case, based on the distance sensor 102 and the ground assisted positioning device 103 that have different performances and different quantities, more laser beams or ultrasonic waves may be emitted to complete the scanning of the entire target object 105.

According to an embodiment, in order to solve the problem of incomplete scanning caused by the target object 105 being blocked by other objects during the movement, the environment image captured by the camera may further be combined to recognize the image object of the target object 105 in the image of the target site area, in a simple image recognition manner, to determine whether the target object 105 is blocked, and to determine the position area which cannot be scanned by the distance sensor 102 and the ground assisted positioning device 103. Based on the determined position area which cannot be scanned, and with reference to the data sensed by the distance sensor 102 and the ground assisted positioning device 103, a part of the data may be filtered out from the sensed data for processing, which is used as the movement sensing data of the target object 105 for subsequent processing.

The AR processing device 107 may be a computing device, such as a server or a host, which may be configured to receive the sensed data of the distance sensor 102 and the positioning sensor, process real-time positioning information of the target object 105 and an object model of the target object 105 in a real scene, process interactive relationship between virtual objects, generate virtual information 108 required to be overlaid in the view range of the user, and transmit the generated virtual information 108 to the AR glasses 104 of the AR glasses 104 of the user. Furthermore, there may be a plurality of AR glasses 104 in the target site area 100. The AR processing device 107 may generate the virtual information for each AR glasses 104, and transmit the corresponding virtual information to each of the AR glasses 104 of users. An antenna configured for wireless communication may be disposed based on common wireless Internet standard, so that the distance sensor 102, the ground assisted positioning device 103 and the positioning sensor disposed on the target object 105 may transmit the movement sensing data of each target object 105 to the AR processing device 107. The AR processing device 107 may also transmit the AR scene processing result, for example, display information, to the AR glasses 104. The movement sensing data may be original data sensed by each sensor. That is, information, such as the position and the rotating angle of the target object obtained directly by each sensor, or data such as the position and the rotating angle obtained after the data from each sensor is processed, may be calculated by the server. The server may directly obtain the information such as the position and rotating angle of the target object.

The dashed line in FIG. 1a shows virtual information 108 that the user can view through the AR glasses 104. Using the AR glasses 104, the user may also view the stools and squares in the scene. According to an embodiment, some interactive elements may be added. For example, the user may go under a virtual tree, look at the type of the virtual tree, and select annual rings of the virtual tree to view age information. Because coverage ranges of the field of view determined based on the position information and the field of view information of the AR glasses 104 are different, the view range of the user at the left side of in FIG. 1a may include a virtual tree and a virtual car, while the view range of the user at the right side may only include the virtual tree. The virtual information 108 overlaid by different display screens of the AR glasses 104 of the user may be determined based on the view range of the user. The calculation of the virtual information 108 that needs to be displayed to the user may be completed by the AR processing device 107.

The AR glasses 104 are a wearable display device. The AR glasses may also be another display device, such as a head up display (Head Up Display, HUD). The basic principle is to cover the view range of the user by using a transparent display screen, and to sense position information and rotating angle information of the AR glasses 104 by using the positioning sensor and the angle sensor disposed on the AR glasses 104, to obtain the user's position information and field of view information. The position information and the field of view information are transmitted to the AR processing device 107. The AR glasses 104 are further configured to display the virtual information 108 existing in the virtual space corresponding to the view range of the user returned by the AR processing device 107, creating an illusion that the virtual information 108 exists in the field of view for the user. The AR processing device 107 may obtain and calculate a current position of the user in the target site area 100 and a field of view rotating angle of a head of the user relative to the initial position after receiving the position information and the field of view information to further obtain the user field of view, and determines the virtual information 108.

Figure 2:
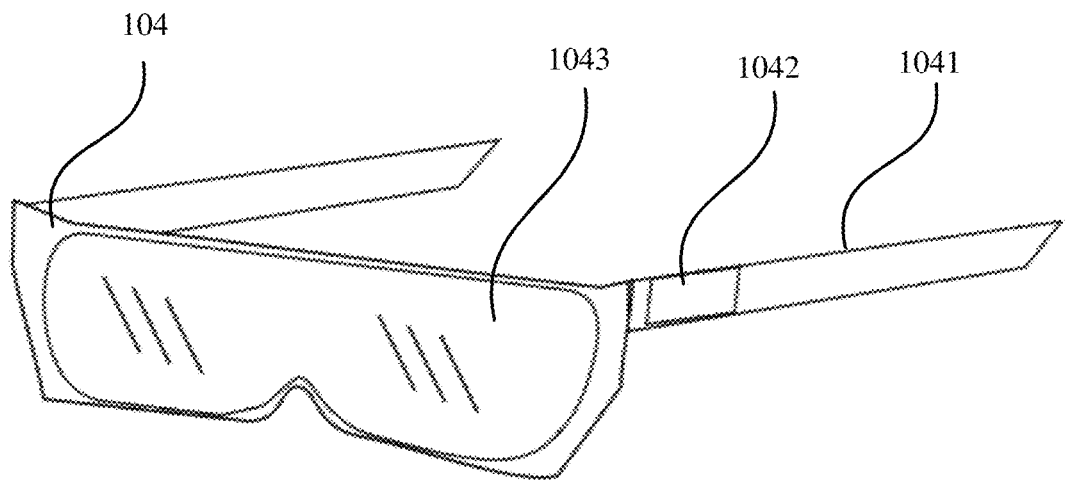
FIG. 2 is a schematic diagram of AR glasses according to an embodiment.

FIG. 2 is a schematic structural diagram of AR glasses 104 according to an embodiment. The AR glasses 104 may include a fixed device 1041, a sensor component 1042 and a transparent display screen 1043, and may further include structures such as a wireless component and a battery. The fixed device 1041 mainly ensures that the AR glasses 104 may be fixed onto a head of the user. A display range of the AR glasses 104 may effectively cover most areas in the middle of the user field of view, and the sensor component 1042 may sense in real-time the position and angle information of the user field of view with the movement of the user's head. The fixed device 1041 may use a simplest ear-mounted glasses frame solution, and may also use an elastic bandage or a full coverage helmet or headgear solution, or neck fixation solution. The sensor component 1042 may be a component based on a six-axis gyroscope chip and/or an acceleration sensor chip, which may directly obtain the position of the user in the target site area 100 and the rotating angle of the user's head. The sensor component 1042 may further include an auxiliary positioning receiver based on a laser, a wireless or an echo. The auxiliary positioning receiver uses a received signal (a laser, a wireless or a sound wave) as an auxiliary. Based on a time difference of the laser, the wireless or the echo received by the auxiliary positioning receiver, or a scan frequency difference, displacement sensing data of the AR glasses 104 may be obtained to determine the position information and the field of view information of the AR glasses 104. The wireless component and the wireless communication antenna in the AR glasses 104 transmit and receive signals. The sensing data of the AR glasses 104 may be uploaded to the AR processing device 107, and the image required to be displayed may be downloaded by the AR glasses 104.

According to an embodiment, the positioning sensor disposed on the target object 105 may include a combination of a plurality of sensors and communication components. The communication component may be a wire connected component and/or a wireless connected component of the AR processing device 107. Combined with a particular fixed device, the positioning sensor may be fixed to the target object 105 in the target site area 100. The position and the rotating angle of the corresponding target object 105 may be recorded and transmitted in real-time. A positioning sensor may be disposed at a plurality of key positions of the target object 105, for example, for the user in the target site area 100, and may be made into a wearable positioning sensor, such as a wristband or a back strap, to accurately determine a plurality of parts of the user's human body in the three-dimensional space in the target site area 100, thereby enhancing the augmented reality scene and improving the user interaction experience.

In the AR scene, an interaction between the user and the object and an interaction between the user and the preset system interface may also be implemented. Specifically, a user operation may be received by disposing a touch pad or a button on an outer frame of a mobile display screen. Alternatively, by using the positioning sensor fixed on the user's hand, when the user makes some particular gestures, for example, moving a finger, a corresponding gesture response operation may be selected based on pose recognition. For example, by using the positioning sensor fixed on the user's wrist, if a swing gesture is detected, the displayed information about the tree may be turned to the next page. If the touch pad or the button is used, data input by the user may be required to be transmitted back to the AR processing device 107. Upon receiving the data, the AR processing device 107 determines how to handle the user's operations on the touchpad or button. After the response processing, the processing result may be displayed on the AR glasses 104 in an image mode.

Figure 3A:
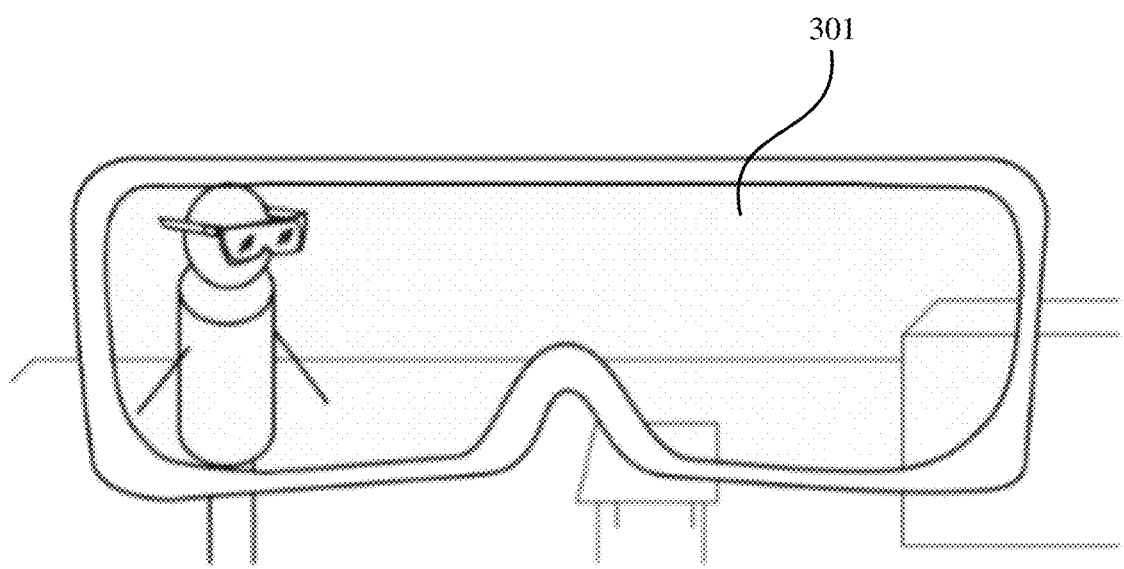
FIG. 3a is a schematic diagram of a site content seen through a pair of AR glasses according to an embodiment.
Figure 3B:
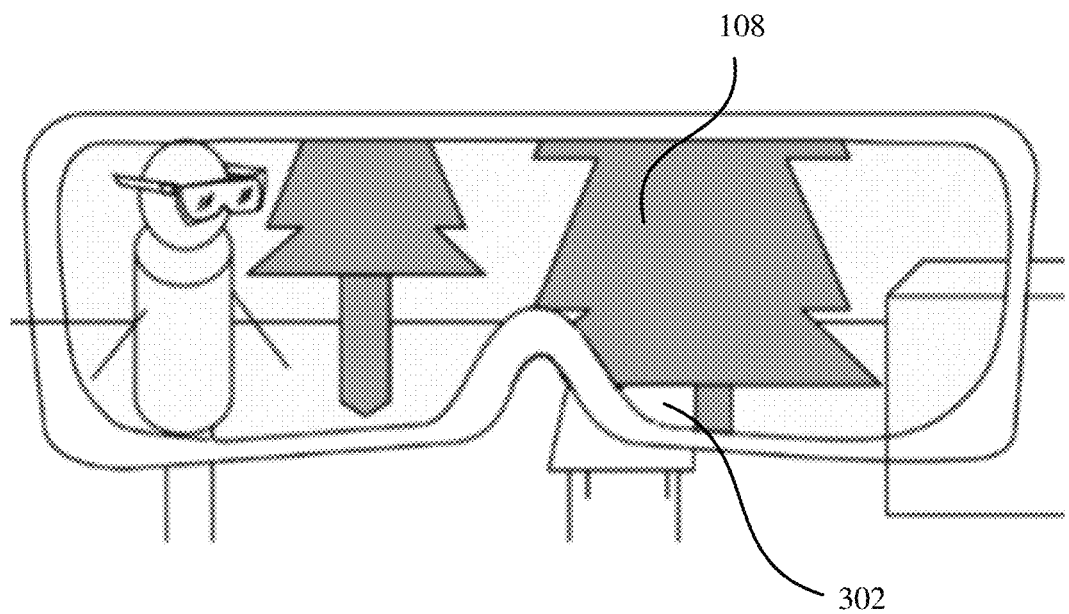
FIG. 3b is another schematic diagram of a site content seen through a pair of AR glasses according to an embodiment.
Figure 3C:
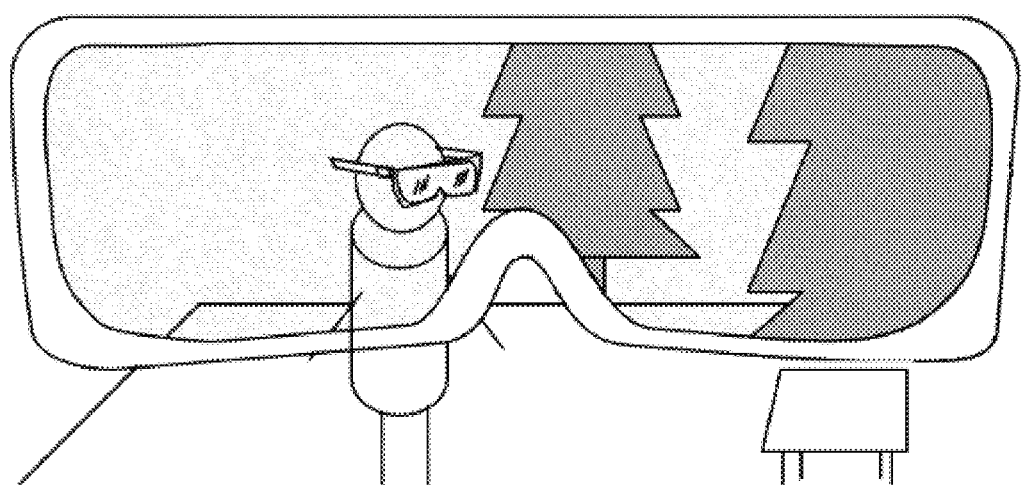
FIG. 3c is still another schematic diagram of a site content seen through a pair of AR glasses according to an embodiment.

From a perspective of a user, a real object in the target site area 100 and the virtual information 108 may co-exist in the view range of the user. With the movement of the view range, all the virtual objects spatially change with the real objects to complete the display of the augmented reality scene and implement the augmented reality scene. As shown in FIG. 3a, when the AR glasses 104 is used only as glasses, the user can see the real object in the target site area 100 through the frame 301 where the transparent display screen 1043 is located, and the virtual information 108 is not displayed. FIG. 3b shows the virtual information 108, that is, two virtual trees in FIG. 3b. In FIG. 3c, the user turns the head at a small angle, a new field of view is determined based on rotating angle, and two virtual trees are overlaid at a new position. The two virtual trees overlaid in FIG. 3c and the two virtual trees shown in FIG. 3b occupy different areas on the display screen, taken from the two same virtual trees based on different fields of view determined by the AR glasses 104.

Figure 4:
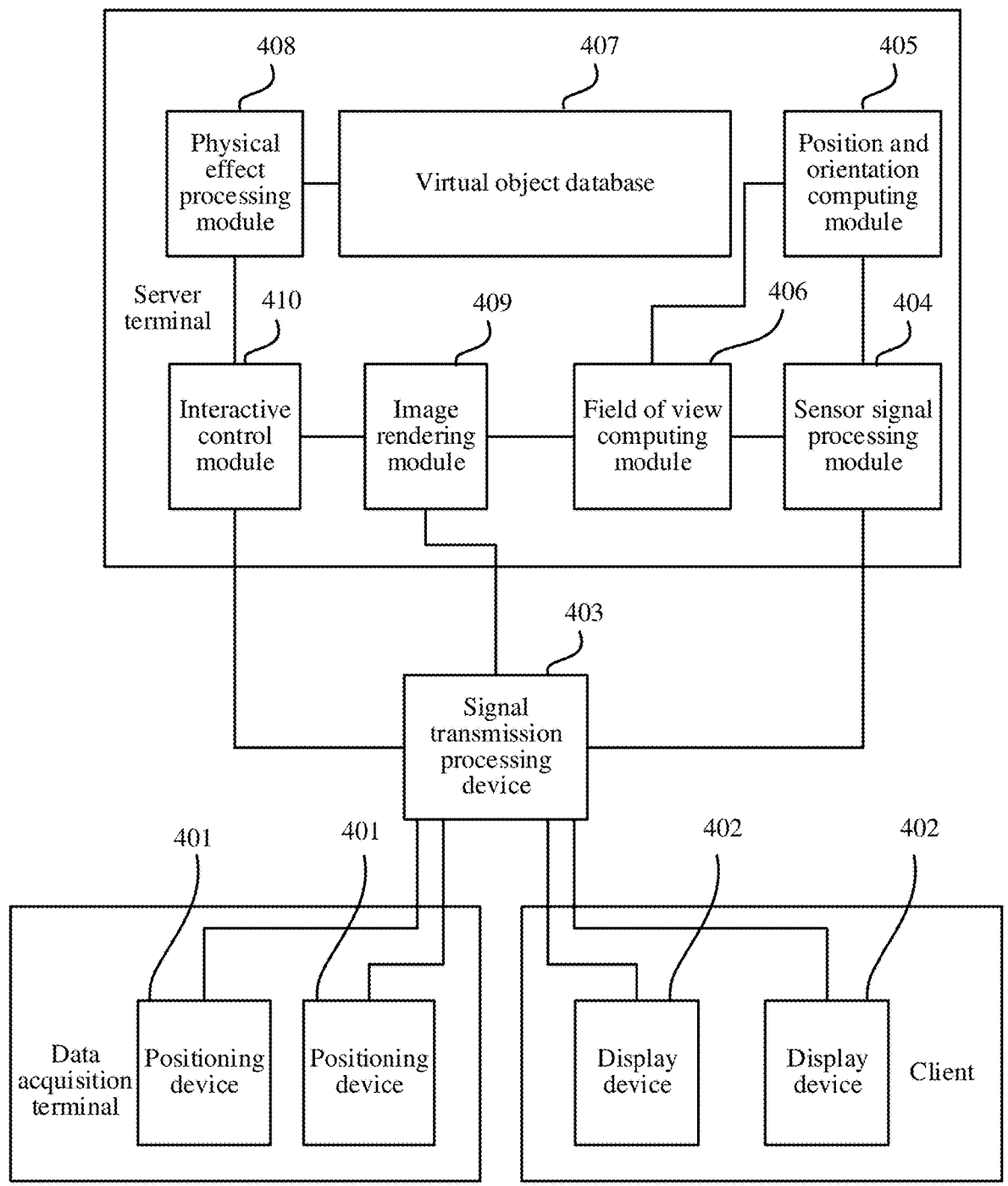
FIG. 4 is a schematic structural diagram of an implementing system of an augmented reality scene according to an embodiment.

FIG. 4 is a schematic structural diagram of an implementing system of an augmented reality scene according to an embodiment. As shown in FIG. 4, the system may include a server, a client and a data acquisition terminal. The server may include one or more servers, and the server may correspond to the AR processing device 107. The client may be a display device 402 that may be worn or carried by the user, for example, the AR glasses 104. The client may include the display devices 402 that may be worn or carried by a plurality of users experiencing AR scenes in the target site area. In FIG. 4, there is a plurality of display devices 402, and a specific quantity of the display devices 402 may be comprehensively determined based on a size of the target site area and a computing power of the AR processing server. The data acquisition terminal may include the plurality of positioning devices 401. These positioning devices 401 may include a sensor that senses the position and rotating angle of a target object during movement, for example, a distance sensor, an acceleration sensor, an angle sensor, a ground assisted positioning device that are disposed on the target object and the AR glasses, and may further include a vision sensor such as a camera for capturing a target object for assisted positioning based on image recognition. A specific quantity of positioning devices 401 may be configured based on an update accuracy requirement of the object model corresponding to the moving object. For a target site area, a multi-directional, multi-angle, multi-number positioning device 401 may be disposed to better detect position of a moving object. A signal transmission processing device 403 may be a wireless transmission access point device such as a WiFi device.

In an embodiment of this application, the AR processing device or the function of service may be implemented by using seven function modules, including: a sensor signal processing module 404, a position and orientation computing module 405, a view range computing module 406, a virtual object database 407, a physical effect processing module 408, an image rendering module 409, and an interactive control module 410.

The server may collect, by using the signal transmission processing device 403, movement sensing data such as the position and the angle of the target object sensed by the positioning device 401. Various kinds of positioning devices 401 collect the movement sensing data obtained by each corresponding sensor at a time interval $T_p$, the movement sensing data received at t moment is recorded as $P^t=(pos^t, angle^t)$, where $pos^t=\{pos_1^t, \ldots, pos_2^t\}$, $pos^t$ represents the movement sensing data of the target object sensed by each positioning device 401 at t moment in the target site area. Sensors, such as a laser and an echo, generally include time or phase differences in signal transmission of corresponding laser signals and echo signals. The acceleration sensor may include the acceleration data, and $angle^t$ is the rotation angle data of the target object recorded by an angle sensor, such as a gyroscope included in the positioning device 401. The moving data and the rotating angle may be used to calculate space motion information of the target object. Each positioning device 401 transmits the movement sensing data sensed at certain time interval to the signal transmission processing device 403. Further, a particular degree of noise reduction and compression may be performed on the movement sensing data $P^t$. Noise data included in the sensing data of each positioning device 401 may be removed to obtain more accurate movement sensing data, and the movement sensing data may be compressed to reduce requirements for wireless transmission bandwidth. The noise reduction processing may be performed by using Fourier transform noise reduction and wavelet transform noise reduction algorithms.

The display device 402, such as the AR glasses, parses and displays the received data to be displayed on the display screen. The data to be displayed mainly includes a virtual image to be displayed, virtual information, a display position on the screen of the display device 402, and the like. Because the data transmitted by the signal transmission processing device 403 may be delayed or congested, a frame rate of data needs to be smoothed and skipped at different moments, and a difference prediction may be performed on the image content when necessary.

The signal transmission processing device 403 is configured to perform effective data transmission, and complete data exchange between the server, the client and the data acquisition terminal. A hardware implementation of the signal transmission processing device 403 may employ near field communication or a wireless local area network solution. The signal transmission processing device 403 may match the communication interface disposed on the server, the client, and the data acquisition terminal, and may be configured to implement the data exchange between the server, the client, and the data acquisition terminal by using these interface transmission data. For example, the signal transmission processing device 403 may communicate with a submodule having a transmitting and receiving function disposed on the display device 402, and the signal transmission processing device 403 may communicate with a transmitting submodule disposed on the positioning device 401. Further, the interface for data transmission on the server may include functions, such as routing and link management in addition to sending and receiving functions.

The signal transmission processing device 403 may be controlled by means of multi-line management in software, and the data to be exchanged may be queued and processed by using a queuing processing algorithm. For signal transmission, a compression algorithm may be used for encoding to reduce a bandwidth requirement of communication. For example, a compression algorithm, such as JPEG or JPEG2000, may be used to process image data, and numerical data may be calculated by arithmetic coding. Control data may be processed by using Huffman coding.

The sensor signal processing module 404 may obtain effective movement sensing data $P_k^{jt}$ corresponding to each sensor from the signal transmission processing device 403 and may calculate the position where the target object is most likely to be located in the target site area, and obtain the position information in the space motion information based on the movement sensing data $P_1^{jt}, \ldots, P_1^{jt}$.

The position and orientation computing module 405 may overlay the angle$^t$ data in the movement sensing data based on the position information calculated by the sensor signal processing module 404, and obtain position information and rotating angle information of the target object in the space of the target site area by calculation.

The virtual object database 407 records three-dimensional models and template data of various objects and virtual objects in the target site area. There are various shapes of real-world objects. For example, the human body may be tall, short, fat or slim. Therefore, it is necessary to provide some template models with parameters, which may be used to simply input parameters to obtain object models that are similar in shape and structure to real-world objects. For example, input height, weight and gender, a character model that meets the requirements may be simply constructed, which may be used as a representation of a virtual character in the three-dimensional scene model corresponding to the target site area. In addition to the human body, simple objects, such as cylinders and cubes, may be included as a basis for object collision interaction. For the three-dimensional model of the virtual object, a finer object model which may represent a virtual object may be configured based on requirements to ensure visual effects during display rendering.

The field of view computing module 406 may determine a user field of view based on the position information and the field of view angle of the display device 402. Because a precision of the field of view determines whether the user's visual experience is accurate, the field of view computing module 406 may perform refined calculation. Specifically, the field of view computing module 406 may determine, based on the sensed position of and rotating angle of the display device 402 such as the AR glasses and with reference to an initial position and the initial angle of the AR glasses, the change in position and the change in angle, thereby obtaining a changed field of view. The shape and size of the field of view may be a rectangle or polygon of a fixed size value, however, the shape and size of the field of view are not limited thereto. After obtaining the position information and the field of view of the display device 402, a target site area of the rectangle or polygon of the fixed size value may be selected from a three-dimensional spatial model representing the target site area, which may be an area that may be viewed in the user field of view. In addition, the obtained position and angle data of the display device 402 may further be smoothed. Generally, smoothing should be performed in combination with logic of the change in field of view and the position of the user's historical perspective. That is, the smoothing process can make the change of the field of view relatively flat, which is suitable for the user to view related content in the augmented reality scene. For example, when the user moves forward, the speed is uneven, but should conform to logic of the acceleration and deceleration of the human body, that is, the field of view change should be in a particular threshold. If this threshold is exceeded, it may be determined that the user is running or jumping. These changes in the motion state may be monitored continuously to provide accurate representation of the sensed movement data. For example, it is impossible to have 5 jumps in one second, and smoothing is required.

The physical effect processing module 408 may be configured to connect a real object and virtual information in virtual space by using a classical mechanics model, so that interactions between users objects in the augmented reality scene conform to common scenes in daily life. For example, the main contents need to be processed may include rigid body collision, elastic deformation, free fall, explosion effect, and the others. Because many objects in the real word do not actually collide with objects in the virtual world, the physical effect processing module 408 may set a three-dimensional rigid body corresponding to the real world object disposed as a scene object during calculation, that is, the motion state thereof may not be changed.

The physical effect processing module 408 may need to input all fixed objects, movable objects (including the user's body) and ground three-dimensional models in the target site area as rigid body objects, which may be disposed as scene objects. In addition, three-dimensional models of some virtual objects may be input to obtain a three-dimensional scene model about a target site area. The three-dimensional scene model may include all object models in the target site area, and some disposed object models of virtual objects, for example, a virtual character, a virtual tree and the like. The spatial position of each object model in the three-dimensional scene model may be substantially the same as the spatial position of the object corresponding to the object model in the target site area. The physical effect processing module 408 may dispose materials of various object models based on interaction requirements and calculate interactions therebetween, by using classical mechanics formula. The object model may be updated in real time based on the position and the state of objects in the target site area in the real world, so that each object model can effectively interact with each other. The interaction between the object model corresponding to the real object and the object model corresponding to the virtual object may involve the interaction, such as collision that may exist between the two mentioned above. Accordingly, the physical effect processing module 408 is implemented by using some physics engines.

Based on the calculation result of the physical effect processing module 408 and the virtual model included in the three-dimensional scene model, the object model or some areas of the object model in the target area in the three-dimensional scene model, are performed image rendering with the field of range obtained by the field of view computing module 406 with reference to virtual information required to be displayed. The virtual information required to be displayed may be converted into an image. For example, a real-time graphic data of the object model of the virtual object may be converted into a virtual image that needs to be overlay-displayed. The block of the real scene for the virtual information needs to be pre-calculated, and the rendering result may be masked to exclude the blocked part of the virtual information, thereby preventing a mistake of generating overlay effect during display. The image rendering engine may use rendering functions in common game engines.

The interactive control module 410 may be configured to process and control interaction logic between the user and each object in the scene. For example, a user viewing a variety of virtual trees, displaying a graphical user interface (Graphical User Interface, GUI) for users to operate. The interactive control module 410 may be disposed based on specific requirements of actual AR application scene. For example, one interface may be reserved to implement subsequent functions.

The embodiments of the present disclosure may perform mobile monitoring of moving objects in a specific site area, and construct and obtain a three-dimensional scene model of the site area. Based on the three-dimensional scene model with reference to the user position carrying the AR display device, virtual information of an augmented reality scene already displayed on the user's display device may be quickly updated, and there is no need to use complex image analysis and recognition algorithms to determine the display position of virtual information. Compared with the conventional processing way of directly overlaying virtual information in the captured image, in the embodiments of the present disclosure, the process of blocking effect is added, so that the blocking and the blocking effect may be better reflected in a case where the augmented reality scene is directly implemented based on the position, so that the augmented reality scene is more realistic. According to an embodiment, the AR processing device and the AR display device may be isolated. The user only needs to carry light AR glasses with the display function, avoiding the problem that AR glasses are cumbersome because traditional AR glasses need to carry cameras. The AR processing device is generally a server that may display requirements based on the virtual information that needs to be processed by a plurality of users' augmented reality scenes simultaneously, and extend new functions so that multiple users' requirements are in the augmented reality scene, thereby saving costs to some extent.

Figure 5:
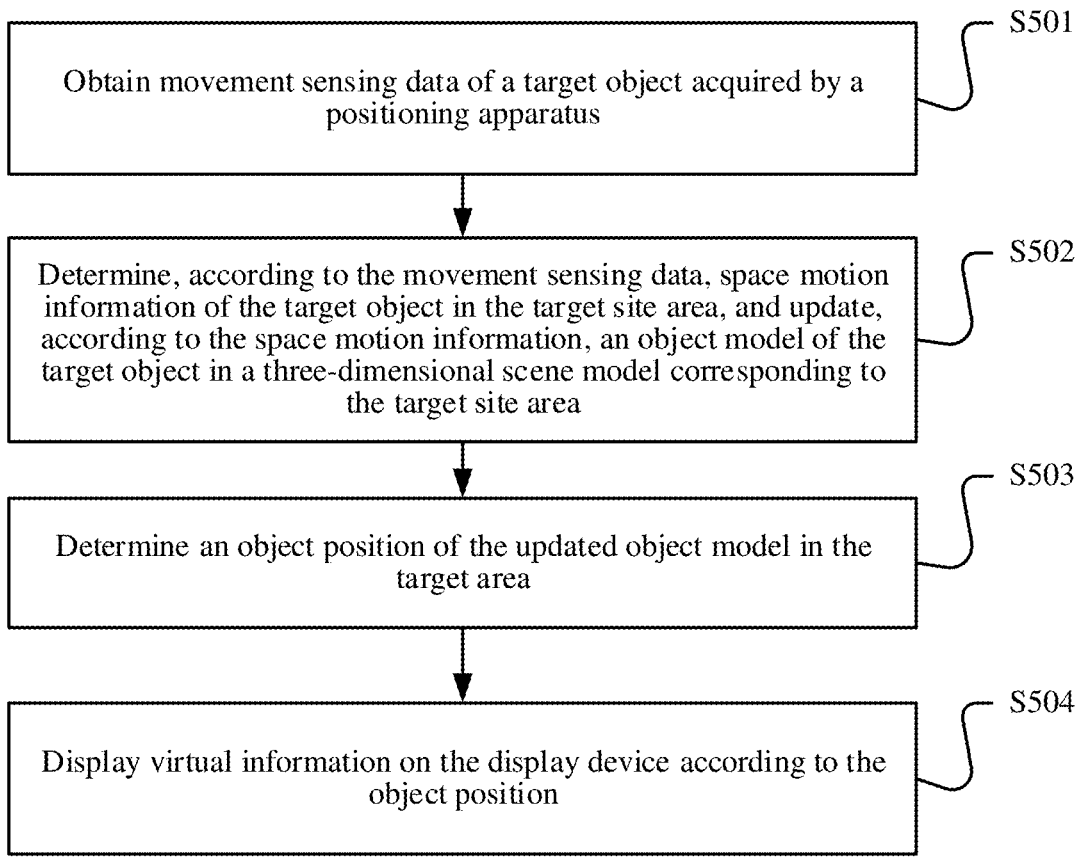
FIG. 5 is a flowchart of a method for implementing an augmented reality scene according to an embodiment.

FIG. 5 is a flowchart of a method for implementing an augmented reality scene according to an embodiment. The method may be performed by an AR processing device. Specifically, the method may be performed by a computing device with an AR processing function, such as a server. Alternatively, the method may also be performed by an AR display device integrated with a sensing data processing function and a display function. The method may include the following steps.

In step S501, the method may include obtaining movement sensing data of a target object acquired by a positioning apparatus, where the positioning apparatus is configured to monitor the target object located in a target site area. The target site area may be a prearranged area, and may be arranged freely according to a user requirement for a scene. Specifically, step S501 may be triggered after a movement of the target object is detected. A gyroscope or an acceleration sensor disposed on the target object may be used to determine whether the target object has moved.

The target site area may be a part of a large site area, or one of a plurality of arranged site areas. The site areas may be arranged, according to the requirement, to be a scene area of an indoor room, a park, a sports field or the like.

The target site area may include a fixed object and a mobile object. For example, in a site area of an indoor room scene, objects such as a closet and a pillar are fixed. A position of the fixed object is known in the site area, and may not need to be monitored by a positioning apparatus. The positioning apparatus may sense movement of the mobile object, so as to monitor a position of the mobile object. The mobile object may be an object, such as a chair or the like, in the site area of the indoor room scene. The target object may be any mobile object in the target site area.

The target object may be a rigid object or a flexible object. Position and angle of the entire target object may be sensed by an acceleration sensor, an angle sensor and a distance ranging sensor (distance sensor includes distance ranging sensor using ultrasonic, laser and the like), such as a laser ranging array, so as to obtain the movement sensing data of the entire target object.

The position information of the target object may be acquired by using a distance measuring sensor, and/or a positioning sensor. Specifically, position information of the target object in the target site area after the target object moves may be determined according to distance data of the target object obtained by at least two distance sensors, and the at least two sensors may be configured to monitor the target object in the target site area. Alternatively, the position information of the target object in the target site area after the target object moves may be obtained by calculation according to motion data sensed by the positioning sensor disposed on the target object.

In addition, when the target object is a flexible object, position of a target object within a relatively low range of height from a ground or a part of the target object may be sensed by a ground auxiliary positioning apparatus. The ground auxiliary positioning apparatus may scan, using methods such as laser array scanning, ultrasonic array scanning or the like, within a specific range, for example, within 20 cm of the height from a ground, to obtain data related to the position information of the target object or a partial structure of the target object in the target site area.

In step S502, the method may include determining, according to the movement sensing data, space motion information of the target object in the target site area, and update, according to the space motion information, an object model of the target object in a three-dimensional scene model corresponding to the target site area. The three-dimensional scene model of the target site area may be a space model. The three-dimensional scene model may include object models of all objects within a specific spatial range of the target site area, and position relationships between objects corresponding to the object models. Specifically, a three-dimensional scene model of which an arrangement is the same as that of the target site area may be created according to a specific percentage of reduction and spatial position areas of actual objects in the target site scene. In the three-dimensional scene model, the arrangement of the object models is the same as that of the corresponding objects in the target site area. That is, the spatial position area occupied by each object model in the three-dimensional scene model is the same as or merely reduced to a specific scale of that occupied by the corresponding object in the target site area. The three-dimensional scene model of the target site area may be preconfigured. An object model of the mobile object exists in the three-dimensional scene model. Therefore, the object model corresponding to the target object in the three-dimensional scene model may be updated subsequently based on a moving condition of the target object obtained.

The obtained movement sensing data, such as acceleration data and/or angular acceleration data of the three-dimensional space in the target site area, sensed by the positioning apparatus, may be processed to remove noise data to reduce error in position data and orientation data. The noise removing methods may include Fourier transform noise reduction and wavelet transform noise reduction algorithm. The position data and the orientation data of the target object in the three-dimensional space in which the target site area is located may be determined by using the movement sensing data. As such, a coordinate system of an actual three-dimensional space in which the target site area is located may be mapped to a coordinate system corresponding to the three-dimensional scene model corresponding to the target site scene. A position obtained by the sensor and a rotation angle corresponding to the orientation data may be mapped, according to the mapping relationship, to the coordinate system corresponding to the three-dimensional scene model. Based on a position and an angle after mapping, and a basic parameter, such as a shape parameter of the object model corresponding to the target object, the object model corresponding to the target object in the three-dimensional scene model may be remodeled, and an obtained object model may be provided with a new position and a new angle in the coordinate system in the three-dimensional scene model.

According to an embodiment, an update to the object model of the target object may include updating the position and/or a spatial orientation of the object model. If the space motion information includes the position information of the target object after the target object moves, a position of the object model of the target object in the three-dimensional scene model may be updated according to the moved position of the target object, and if the space motion information includes rotation angle information of the target object after the target object moves, the spatial orientation of the object model of the target object in the three-dimensional scene model may be updated according to the rotated angle of the target object.

If the target object is a rigid object, after the target object moves, an original object model corresponding to the target object in the three-dimensional scene model may be required to be moved or rotated according to the position information and rotation angle information in the movement sensing data.

If the target object is a flexible object, after the target object moves, position information and/or rotation angle information of a plurality of spots of the target object is obtained by calculation based on the distance data that is obtained by different distance measuring sensors that are on different spots of the target object and based on an algorithm, such as triangulation position algorithm. If many spots on the target object are moved and/or rotated, the object model of the target object in the three-dimensional scene model may be re-established based on the moved and/or rotated spots. Moreover, if the target object is a flexible object, after the target object moves, positions and/or angles of different components of the target object in the three-dimensional space of the target site may be obtained by calculation based on the position information and/or rotation angle information of the positioning sensor at different parts of the target object. The object model of the target object in the three-dimensional scene model may be re-obtained by directly moving and rotating a corresponding component model in the object model of the target object respectively based on the position and the angle.

During the process of updating the object model of the target object, based on various movement sensing data described above, images may be combined to perform a more precise update on the object model. The target site area may be further provided with at least two image sensors, configured to monitor the target object from different monitoring angles to obtain image data of the target object. Step S502 may further include updating, according to the space motion information, the object model of the target object in the three-dimensional scene model corresponding to the target site area to obtain an initially updated object model, identifying an image object of the target object from an image acquired by the at least two image sensors, and modifying the initially updated object model according to the identified image object to obtain an updated object model of the target object. The initially updated object model may be obtained by updating, based on the foregoing position information and/or rotation angle information in the space motion information, the position and orientation of the object model of the target object of the object model of the target object in the three-dimensional scene model.

In step S503, the method may include determining a target object position of the updated object model in the target area. The target area may be an area determined in the three-dimensional scene model according to position information and field of view information of the display device in the target site area, and the determined target area may be considered as a field-of-view area. It may be considered that the object model included in the target area (or a part of a model area of the object model) corresponding to the object (or a part of the object) may be seen by a user.

According to an embodiment, a determining manner of the target area may include obtaining the position information and the field of view information of the display device in the target site area, where the display device is configured to display virtual information of an augmented reality scene, determining a user field of view according to the position information and the field of view information, and determining the target area in the established three-dimensional scene model according to the user field of view. For a head-mounted display device, such as AR glasses, after the startup by a user, the position information and the field of view information of the display device may be sensed based on an angle sensor, such as the positioning sensor and a gyroscope. A rectangular frame of a fixed size or a polygon of a fixed size according to frame ranges of different VR glasses, such as the shape of the frame 301 of the AR glasses in FIG. 3a, may be pre-configured to represent a field-of-view range. The field of view information may represent angle information after rotation relative to initial field-of-view orientation. After the position and a field-of-view angle are determined, a new field-of-view orientation may be obtained by rotating the initial field-of-view orientation according to an angle indicated by the field of view information. The target area that should appear in the field-of-view range of the user in the three-dimensional scene model may be framed out based on the determined position and the new field-of-view orientation, and according to the rectangular box or the polygon of the fixed size.

Moreover, the obtaining the position information and the field of view information of the display device in the target site area may include receiving the position information obtained after the positioning apparatus locates the display device, in which the positioning apparatus may include a positioning sensor disposed on the display device, and/or a distance sensor that is disposed in the target site area, configured to locate the display device, and receiving the field of view information of the display device sensed by an angle sensor disposed on the display device. The positioning apparatus may be an acceleration sensor, and may obtain, by sensing a tri-axial acceleration and time, and displacement of the display device relative to the initial position. The distance sensor may obtained the displacement of the display device by using triangle localization algorithm based on the displacement distance of the display device sensed by at least two distance sensors.

The target area in the three-dimensional scene model may also include an object model of another object other than the target object. After the update is completed, a position relationship between the updated object model and the target area is determined. If the position relationship indicates that any position area of the updated object model is not in the target area, then the detection of the movement of a new target object may be continued. If the position relationship indicates that all or a part of areas of the updated object model is in the target area, an object position of the object model of the target object in the target area may be further determined so as to perform step S504 described herein below. The object position may be in the target area, and may refer to a position in which the entire object model of the target object or a part of the target object that is in the target area. For example, as shown in FIG. 3b, a small desk is a target object, and a part of an object model of the small desk is shown in the frame of the AR glasses. The field-of-view range area of the frame corresponds to the target area in the three-dimensional scene model, and the object position is the position of a part of the object 302 located in the frame corresponding to the target area.

In step S504, the method may include displaying virtual information on the display device according to the object position, so as to display the virtual information in the augmented reality scene. The obtained object position may be used to determine whether the virtual information is influenced, for example, whether the target object in the object position blocks the virtual information or whether it is required to display the virtual information to the user in a position corresponding to the object position.

Specifically, if it is required to present the user with the virtual information overlaid on the target object, the object position may be mapped to a display area of the display device according to a mapping relationship between the target area and a lens area of the display device, then a new piece of virtual information may be generated, and the generated virtual information is presented to the user by projection on the display area, so that the user may see the augmented reality scene through the display device, such as AR glasses. Further, the currently displayed virtual information on the display device may be updated to obtain new virtual information, and the updated virtual information may be displayed. The update may include a mask processing performed to the currently displayed virtual information in a case that the target object moves onto the object position and blocks the currently displayed virtual information and/or a blocking removal performed to the currently displayed virtual information in a case that the target object moves onto the object position so that the target object does not block the part of an area of the currently displayed virtual information. If it is determined, according to the object position, that the movement of the target object does not have the foregoing influence on the displayed virtual information or to-be-displayed virtual information, the displaying virtual information may be refreshed, according to a normal generation and display refresh frequency, to display the to-be-displayed virtual information or continue displaying the currently displayed virtual information.

The displaying of the virtual information may be performed in a plurality of manners. For example, a to-be-displayed image including the virtual information may first be generated, and each pixel of the to-be-displayed image may be rendered to adjust a color value of each pixel. The to-be-displayed image after rendering may be used as an image overlay layer. The image overlay layer may be projected to the translucent lens of the AR glasses by invoking the projector disposed on the AR glasses, focusing on a retina by reflection of the translucent lens, to be captured by human eyes. When the image overlay layer including the virtual information is captured, the real target site area may also be seen through the translucent lens.

Moreover, the color value of each pixel after the adjustment may be determined according to environment information of the target site area. Different environment information may perform different adjustments to the color value of the pixels, so that the to-be-displayed image matches, when finally presented to the user, with an environment of the target site area. The environment information may include information, such as a temperature and/or light intensity of the target site area. For example, in an environment with relatively high light intensity, an image obtained after adjusting the pixels presents an overall brighter color.

After determining the object position of the object model and the target object in the target area, it may be required to determine whether the object model, in the object position, and the target object block the currently displayed virtual information on the display device. If the object model blocks the currently displayed virtual information, a blocked part in the virtual information may be required to be removed, and partial virtual information of the blocked part may not be displayed. For example, a part of the tree at a right side of FIG. 3b is actually blocked by the part of the object 302. Also, the object model may no longer block the virtual information when the target object is moved, and in this case, the previously blocked part of the virtual object is required to be updated and displayed.

Furthermore, when the foregoing steps are performed by a server having an AR processing function, the method may also include sending a display message to the display device, where the display message carries the virtual information to be displayed on the display device and is configured to instruct the display device to display the carried virtual information, to overlay-display the generated virtual information in the target area covered by the user field of view and implement displaying the augmented reality scene.

The embodiments of the present disclosure may monitor a moving object in a specific range of a site area, update an object model of the moving object in a three-dimensional scene model corresponding to the site area in time after the object moves, generate, according to the updated three-dimensional scene model, virtual information to be displayed by a display device, and implement, in combination with a real site area seen through the display device, to display an augmented reality scene. The method does not require a complex image analysis recognition algorithm to determine a display position of the virtual information, and the calculation may be performed quick and easy, thereby improving efficiency of implementing an augmented reality scene.

Figure 6:
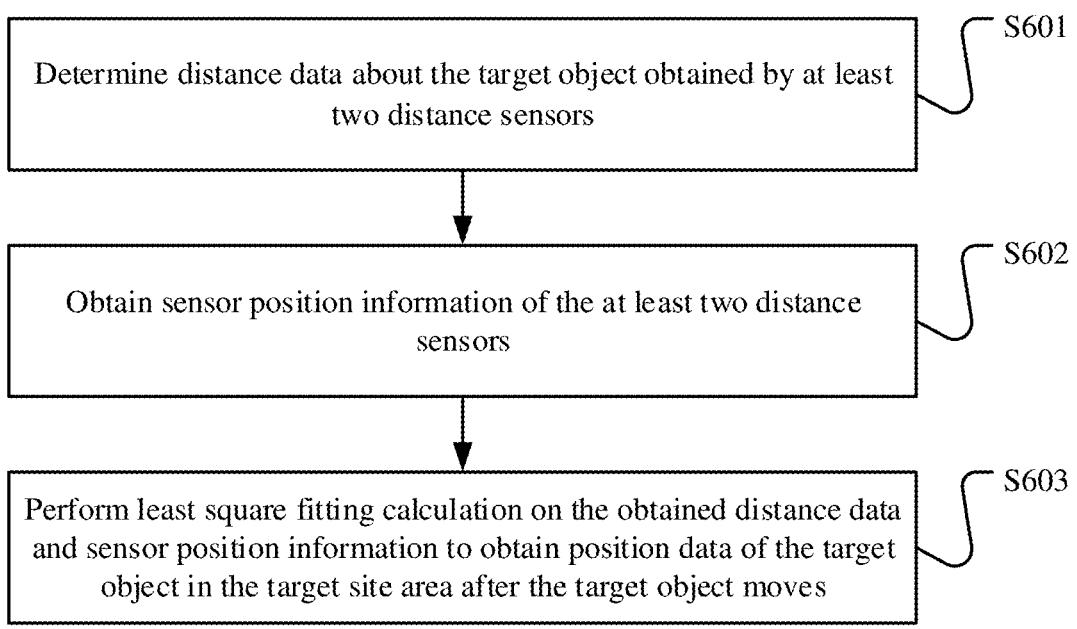
FIG. 6 is a flowchart of a position information determining method based on distance data according to an embodiment.

FIG. 6 is a flowchart of a position information determining method based on distance data according to an embodiment. The method corresponds to step S501 in the foregoing embodiment, and is one of implementations for obtaining the position information. The method may include the following steps.

In step S601, the method may determine distance data about the target object, obtained by at least two proximity sensors. The at least two proximity sensors may be configured to monitor the target object in the target site area. The proximity sensor may further include a distance measuring sensor using ultrasonic, laser or the like. Here, the proximity sensor may be dedicated to measuring a distance of the target object. For example, a receiver corresponding to the distance measuring sensor, using ultrasonic, laser or the like, may be disposed in a plurality of spots on the target object.

The receiver may obtain a time of receiving the ultrasonic and the laser, and the time may be fed back to the proximity sensor. Accordingly, the distance data is determined by the proximity sensor.

In step S602, the method may include obtaining sensor position information of the at least two proximity sensors. The position information of the proximity sensors are pre-configured data, and the sensor position information may also be referred to as position information in the target site area.

In step S603, the method may include performing least square fitting calculation on the obtained distance data and sensor position data to obtain the position information of the target object in the target site area after the target object is moved.

For k proximity sensors, each piece of the valid distance data $P^{jt}$ is obtained, and the most possible position in the target site area is calculated according to the pieces of the distance data $P_1^{jt}, \ldots, P_k^{jt}$. A specific algorithm requires to input a coordinate $POS_k$ (such as a spatial position of a sensor such as a laser positioning transmitter) of each positioning apparatus on the target site area, and is calculated by the least square fitting:

$$pos_j^* = \operatorname*{argmin}_{pos} \sum (pos_k^{jt} - dist(POS_k, pos))^2;$$

An optimal position $pos_j^*$ of a monitored object in the target site area is obtained by estimation, where the dist function represents a distance function, and a three-dimensional Euclidean distance is generally used. $POS_k$ is known, and pos is an auxiliary parameter in the least square fitting calculation.

During a process of displaying the virtual information in the augmented reality scene, the position of the target object may be precisely calculated through the foregoing calculation manner. In particular, based on distance data of a plurality of proximity sensors, the position of the target object can be obtained more quickly and accurately.

Figure 7:
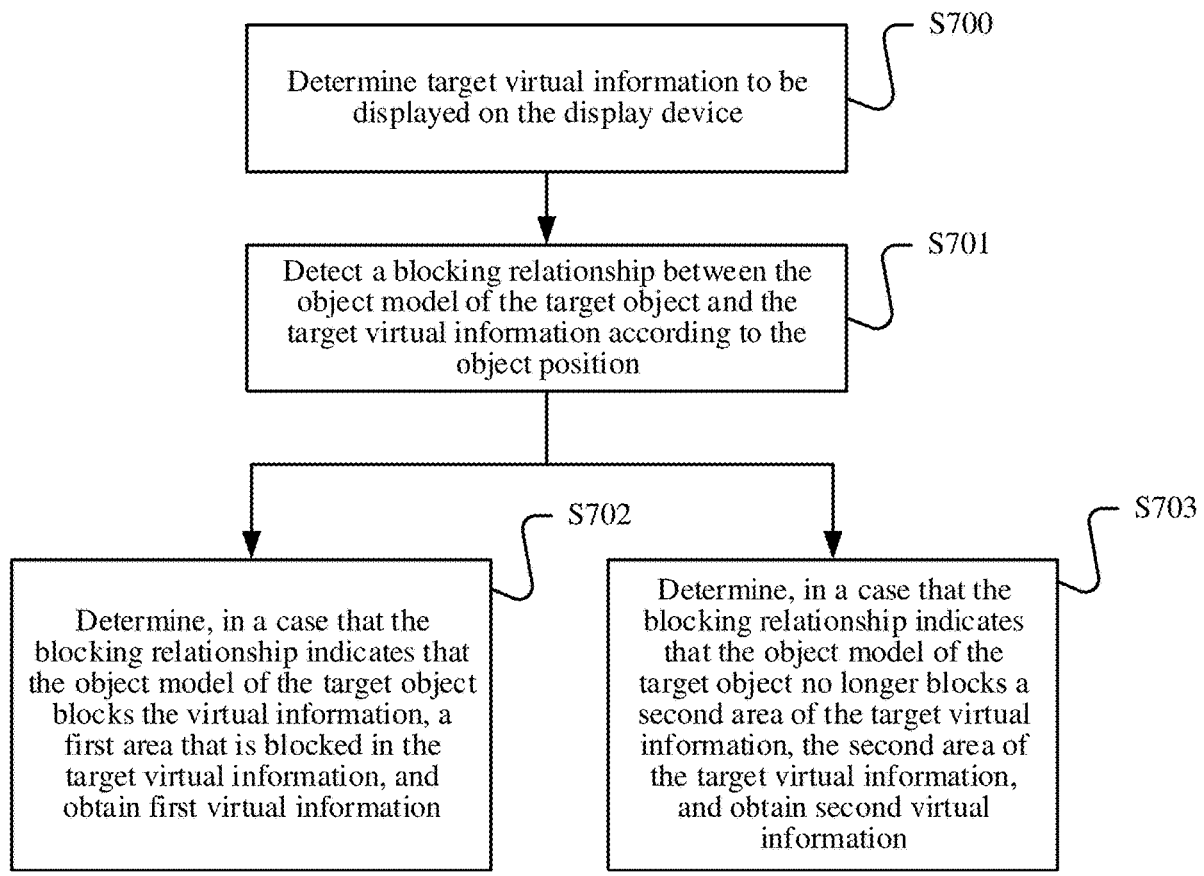
FIG. 7 is a flowchart of a virtual information updating method according to an embodiment.

FIG. 7 is a flowchart of a virtual information updating method according to an embodiment. FIG. 7 relates to step S504 in the foregoing embodiment, and is one of virtual information updating methods. The method may include the following steps.

In step S700, the method may include determining target virtual information to be displayed on the display device. The determined target virtual information may be new virtual information required to be overlay-displayed in the augmented reality scene so that the user may view through the display device, such as AR glasses. One or more pieces of information required to be displayed in a superimposed manner and/or images may be selected, as the target virtual information, from pre-configured content, such as pieces of information and images. In addition, the determined target virtual information may also correspond to the currently displayed virtual information on the display device. For example, the currently displayed virtual information may be about a treetop part of a virtual tree image. The virtual information of the currently shown treetop part may correspond to the virtual tree image, and the currently determined virtual tree image may also be used as the target virtual information, so as to subsequently perform a processing step of updating the currently displayed virtual information because of the movement of the target object.

In step S701, the method may include detecting a blocking relationship between the object model of the target object and the target virtual information according to the object position. The blocking relationship between the object model and the target virtual information may be determined according to an object position and a shape of the object model, a position of a target virtual information to be displayed and a shape of the target virtual information, and a position and an orientation of the display device. Specifically, the object position may correspond to a spatial position area occupied by the target object in the target site area, and is not simply a position spot.

In step S702, the method may include determining, in a case that the blocking relationship indicates that the object model of the target object blocks the virtual information, a first area that is blocked in the target virtual information, and obtain first virtual information, where the first virtual information does not include content corresponding to the first area of the target virtual information. As shown in FIG. 3b, the virtual tree, as the virtual information 108, is blocked by a small desk, for example, a part of the object 302. The part of the object 302 is considered as a first area, and when the target virtual information is processed, an image content of this part is required to be removed. The first virtual information is virtual information that is finally generated and to be displayed on the display device.

In step S703, the method may include determining, in a case that the blocking relationship indicates that the object model of the target object does not block a second area of the target virtual information, obtain second virtual information, where the second virtual information includes content corresponding to the second area of the target virtual information. For example, if the small desk is moved away by another user, according to a new object position of the object model corresponding to the small desk, it is determined that the object model of the small desk no longer blocks the virtual tree (the virtual information 108). The content of the blocked second area, for example, the part of the object 302, is determined so as to obtain the second virtual information of the content corresponding to the second area. As such, the second virtual information is the virtual information that is finally generated and to be displayed on the display device.

Compared with a conventional processing manner of directly superimposing the virtual information on a captured image, the embodiments of the present disclosure adds the blocking processing, so that the embodiments can better show effects of blocking and blocking removal in a case that the augmented reality scene is directly implemented based on the position, allowing the augmented reality scene to be more realistic.

Figure 8:
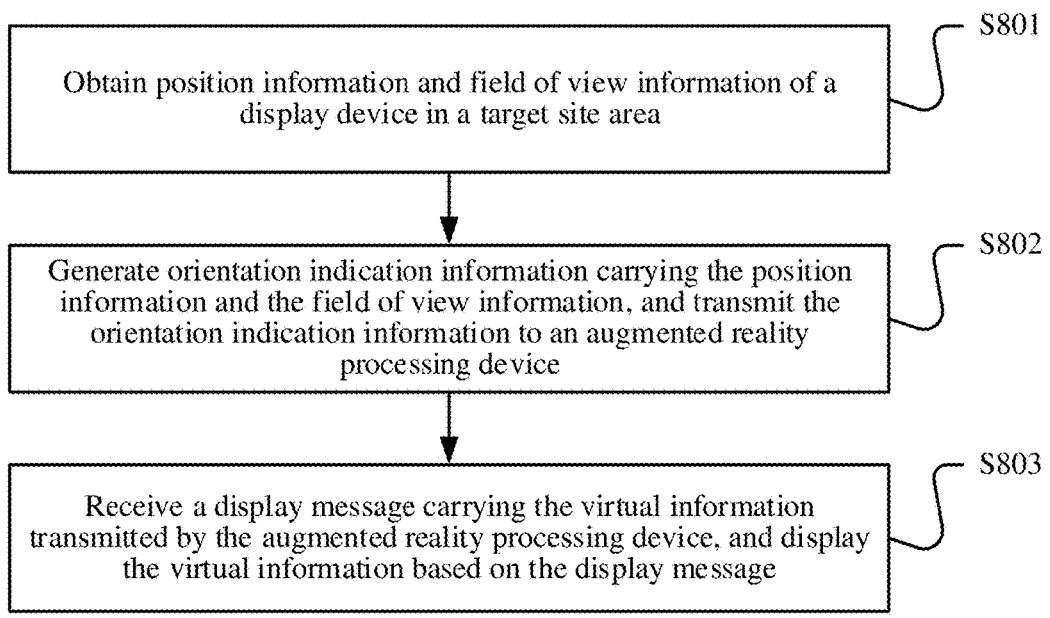
FIG. 8 is a flowchart of another method for implementing an augmented reality scene according to an embodiment.

FIG. 8 is a flowchart of another method for implementing an augmented reality scene according to an embodiment, and the method may be performed by an AR display device. The AR display device may update the display of virtual information in the augmented reality scene through interaction with the AR processing device, and overlay-display the virtual information in a user field of view to display the augmented reality scene. The method may include the following steps.

In step S801, the method may include obtaining the position information and the field of view information of the display device in the target site area. The display device may be configured to display the virtual information of the augmented reality scene. The position information and the field of view information of the display device may be sensed based on an angle sensor, such as a positioning sensor or a gyroscope.

In step S802, the method may include generating orientation indication information including the position information and the field of view information, and send the orientation indication information to the augmented reality processing device. The orientation indication information may include virtual information that is generated by the augmented reality processing device and that is to be displayed in the user field of view determined by the position information and the field of view information. The manner in which the augmented reality processing device obtains the virtual information or updates virtual information according to the position information and the field of view information, may be referenced to the description of relevant contents in the foregoing embodiments.

In step S803, the method may include receiving a display message that is sent by the augmented reality processing device and that carries the virtual information, and display the virtual information according to the display message, so as to display the virtual information in the user field of view in a superimposed manner to complete displaying of the augmented reality scene. The augmented reality display device may only display the virtual information or the updated virtual information. A real object in the target site area may be seen through the augmented reality display device, and the virtual information may be displayed in a superimposed manner.

The step S803 may further include receiving an image sequence and an image timestamp sequence sent by the augmented reality processing device, obtaining a time value of a current moment, and deleting, in a case that a target timestamp exists in the received image timestamp sequence, an image frame corresponding to the target timestamp from the image sequence. The target timestamp may include a timestamp, a difference between the timestamp and the time value of the current moment greater than twice an image display refreshing period of the display device in the image timestamp sequence.

To-be-displayed virtual information received by the display device at a moment t includes an image sequence I, where I=(img$_{t1}$, img$_{t1}$, ..., img$_{tm}$), and the timestamp T$_s$ corresponding to each piece of the image data in the image sequence, where T$_s$=(t$_s^1$, t$_s^2$, ..., t$_s^k$), and the image display refreshing period of the display device is t$_s$. Here, if the current moment t−t$_s^i$>2 t$_s$ represents that a next image frame of the i$^{th}$ frame has been currently received, the i$^{th}$ frame img$_{ti}$ may be discarded directly. If a case that t−t$_s^i$>2 t$_s$ exists, the discarded i$^{th}$ image may be predicted through a difference prediction manner. A method in which img$_{ti}$=img$_{ti-1}$+ Δimg may be used for pre-calculation to reduce effects of freezing and lagging in the displayed image on the screen caused by transmission. Δimg is obtained through calculation according to a pixel value of relevant pixels in image data of a previous frame and a next frame of the i$^{th}$ frame. A specific calculation manner may use a piecemeal motion interpolation method, and a specific algorithm may be an H.265 compression algorithm standard. Furthermore, smooth processing of a frame rate may be performed to data of different moments, and when necessary, difference prediction may be performed on the content of the image.

According to an embodiment, the AR processing device may be separated from the AR display device, and the user only needs to carry a light AR display device having a display function, such as AR glasses, thereby preventing a problem that AR glasses are relatively cumbersome because the conventional AR glasses are required to carry a camera. In addition, the AR display device may suitably discard a part of data from the received to-be-displayed virtual information to implement smooth processing quickly, and further prevent lagging and freezing.

Figure 9:
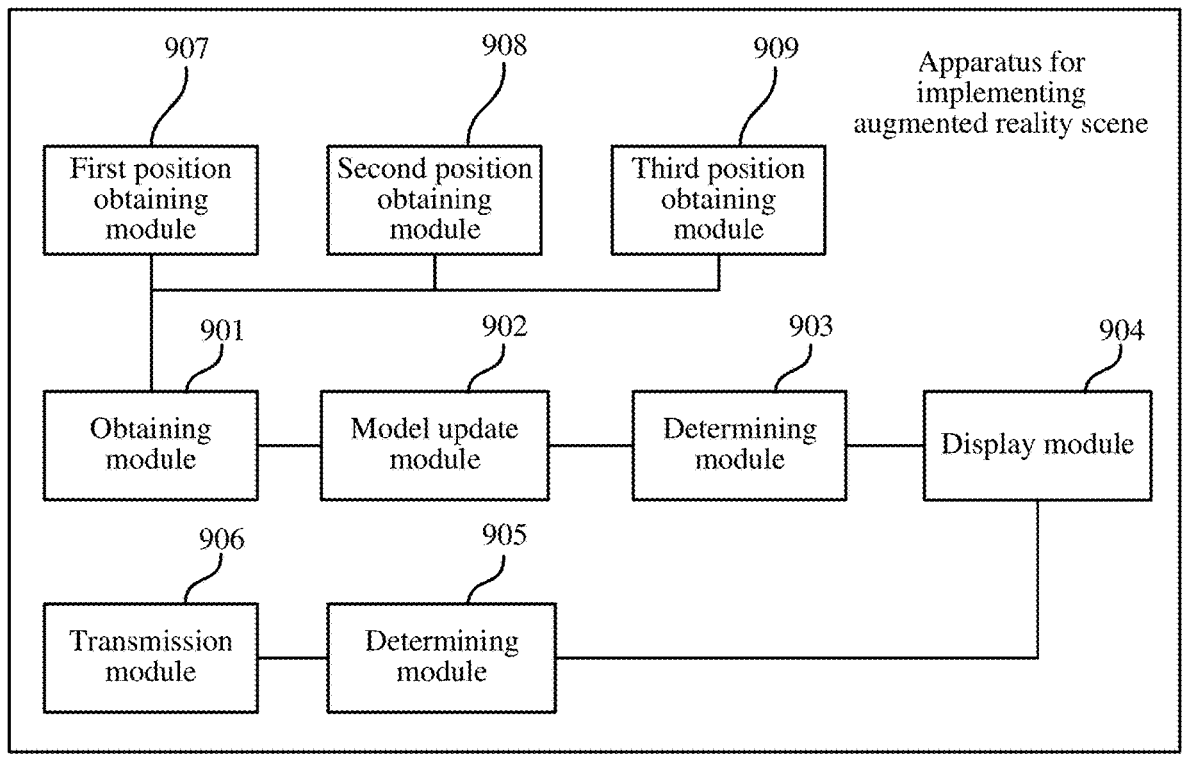
FIG. 9 is a schematic structural diagram of an apparatus for implementing an augmented reality scene according to an embodiment.

FIG. 9 is a schematic structural diagram of an apparatus for implementing an augmented reality scene according to an embodiment. The apparatus may be disposed in an AR processing device, for example, in a server having an augmented reality function. The apparatus may include an obtaining module 901 configured to obtain movement sensing data of a target object acquired by a positioning apparatus, the positioning apparatus being configured to monitor the target object located in a target site area; a model update module 902 configured to determine, according to the movement sensing data, space motion information of the target object in the target site area, and update, according to the space motion information, an object model of the target object in a three-dimensional scene model corresponding to the target site area; a determining module 903 configured to determine an object position of the updated object model in a target area, the target area being an area determined in the three-dimensional scene model according to position information and field of view information of the display device in the target site area; and a display module 904 configured to display virtual information on the display device according to the object position, to display the virtual information in the augmented reality scene.

The positioning device may include various sensors described above, and may include a proximity sensor, a positioning sensor, and a ground assisted positioning device and the like. Specifically, the device may include an angle speed sensor, an angle sensor, an infrared ranging sensor, and a laser ranging sensor. These sensors may be disposed in the target site area, or may be disposed on each target object of the target site area, which are configured to perform movement sensing on each target object to obtain corresponding movement sensing data.

The three-dimensional scene model of the target site area is a space model. The three-dimensional scene model may include object models of all objects within a specific spatial range of the target site area, and position relationships between objects corresponding to the object models.

The model update module 902 may be configured to update the object model of the target object by updating the position and/or a spatial orientation of the object model. If the target object is a rigid object, after the target object moves, an original object model corresponding to the target object in the three-dimensional scene model may be required to be moved or rotated according to the position information and rotation angle information in the movement sensing data. If the target object is a flexible object, the three-dimensional scene model may be required to sense a plurality of position points to obtain relevant sensing data of the entire target object and update the entire object model.

The display module 904 may be configured to present the user the virtual information superimposed on the target object. As such, the object position may be mapped to a display area of the display device according to a mapping relationship between the target area and a lens area of the display device, new virtual information may be generated, and the generated virtual information may be presented to the user by projection on the display area, so that the user may view the augmented reality scene through the display device. The display module 904 may be further configured to update the currently displayed virtual information on the display device to obtain virtual information, and display the updated virtual information. The update may include a mask processing performed to the currently displayed virtual information in a case that the target object moves to the object position and blocks the currently displayed virtual information, or a blocking removal performed to the currently displayed virtual information in a case that the target object moves to the object position and does not block the part of area of the currently displayed virtual information. If it is determined, according to the object position, that the movement of the target object does not have the foregoing influence on the displayed virtual information or to-be-displayed virtual information, the display module 904 may be further configured to refresh, according to a normal generation and display refresh frequency, displaying of the to-be-displayed virtual information or previously displayed virtual information.

After determining, by the determining module 903, the position of the object model of the target object in the target area, the display module 904 may determine whether the object model of the target object blocks the currently displayed virtual information of the display device. If the object model blocks the currently displayed virtual information, a blocked part in the virtual information is required to be removed, and virtual information of the blocked part is not displayed. For example, a part of the tree on a right side of FIG. 3b is blocked by the part of the object 302. When the object model of the target object is moved and no longer blocks the virtual information, the blocked part of the virtual object is required to be updated and displayed.

In an embodiment, the space motion information may include position information and/or rotation angle information of the target object after moving, and the model update module 902 may be configured to update, in a case that the space motion information includes the position information of the target object after the target object moves, a position of the object model of the target object in the three-dimensional scene model according to the position information and update, in a case that the space motion information includes the rotation angle information of the target object after moving, spatial orientation of the object model of the target object in the three-dimensional scene model according to the rotation angle information.

A first position obtaining module 907 may be configured to obtain distance data of the target object by at least two proximity sensors, and determine the position information of the target object in the target site area after the target object moves, the at least two proximity sensors being configured to monitor the target object in the target site area. A second position obtaining module 908 may be configured to calculate, according to motion data sensed by a positioning sensor disposed on the target object, the position information of the target object in the target site area after the target object moves. A third position obtaining module 909 may be configured to calculate, according to data sensed by a ground auxiliary positioning apparatus disposed in the target site area, position information of the target object or a partial structure of the target object in the target site area, a height of the target object or the partial structure of the target object from a ground falling within a preset height threshold range. According to an embodiment, any one of or a plurality of modules including the first position obtaining module 907, the second position obtaining module 908 and the third position obtaining module 909 may be implemented according to a practical requirement and an arrangement of positioning apparatus.

The first position obtaining module 907 may be further configured to determine distance data about the target object obtained by at least two proximity sensors, obtain sensor position information of the at least two proximity sensors, and perform least square fitting calculation on the obtained distance data and sensor position information to obtain the position information of the target object in the target site area after the target object moves.

In an embodiment, the target site area may be further provided with at least two image sensors configured to monitor the target object from different monitoring angles to obtain image data of the target object. The model update module 902 may be further configured to update, according to the space motion information, the object model of the target object in the three-dimensional scene model corresponding to the target site area to obtain an initially updated object model. An image object of the target object may be identified from an image acquired by the at least two image sensors, and the initially updated object model may be corrected according to the identified image object to obtain an updated object model of the target object.

A determining module 905 may be configured to obtain the position information and the field of view information of the display device in the target site area, the display device being configured to display the virtual information of the augmented reality scene, Here, a user field of view may be determined according to the position information and the field of view information, and the target area may be determined in the established three-dimensional scene model according to the user field of view.

Further, the determining module 905 may be configured to receive the position information obtained after the positioning apparatus locates the display device, where the positioning apparatus includes a positioning sensor disposed on the display device, and/or a proximity sensor that is disposed in the target site area and configured to locate the display device and receive the field of view information of the display device sensed by an angle sensor disposed on the display device.

According to an embodiment, the display module 904 may be further configured to determine target virtual information to be displayed on the display device, detect a blocking relationship between the object model of the target object and the target virtual information according to the object position, determine, in a case that the blocking relationship indicates that the object model of the target object blocks the virtual information, a first area that is blocked in the target virtual information, and obtain first virtual information. Here, the first virtual information does not include a content corresponding to the first area of the target virtual information. The display module 904 may also determine, in a case that the blocking relationship indicates that the object model of the target object does not block a second area of the target virtual information, the second area of the target virtual information, and obtain second virtual information, where the second virtual information includes a content corresponding to the second area of the target virtual information.

A transmission module 906 may be configured to send a display message to the display device, where the display message carries the virtual information to be displayed on the display device, and may be configured to instruct the display device to display the carried virtual information to overlay-display the generated virtual information in the target area covered by the user field of view to complete the displaying of the augmented reality scene. The virtual information obtained by the transmission module 906 may be sent, to an AR display device to instruct the AR display device to display the virtual information in a corresponding position.

The embodiments of the present disclosure may monitor a moving object in a specific range of a site area, update an object model of the moving object in a three-dimensional scene model corresponding to the site area in time after the object moves, generate, according to the updated three-dimensional scene model, virtual information to be displayed by a display device, and implement, in combination with a real site area seen through the display device displaying an augmented reality scene. The method does not require a complex image analysis recognition algorithm to determine a display position of the virtual information, and calculation is quick and easy, thereby improving efficiency of implementing an augmented reality scene.

Figure 10:
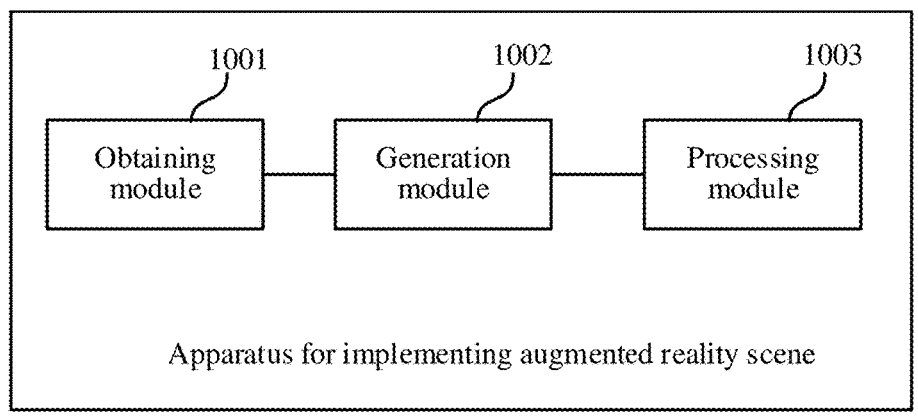
FIG. 10 is a schematic structural diagram of another apparatus for implementing an augmented reality scene according to an embodiment.

FIG. 10 is a schematic structural diagram of another apparatus for implementing an augmented reality scene according to an embodiment. The apparatus may be disposed in an AR display device, for example, in AR glasses having a function of displaying relevant virtual information of the augmented reality scene. The apparatus may include an obtaining module 1001 configured to obtain the position information and the field of view information of the display device in the target site area, the display device being configured to display the virtual information of the augmented reality scene; a generation module 1002 configured to generate orientation indication information carrying the position information and the field of view information, and send the orientation indication information to the augmented reality processing device, the orientation indication information being used to indicate the virtual information that is generated by the augmented reality processing device and that is to be displayed in the user field of view determined by the position information and the field of view information; and a processing module 1003 configured to receive a display message that is sent by the augmented reality processing device and that carries the virtual information, and display the virtual information according to the display message to overlay-display the virtual information in the user field of view to complete displaying of the augmented reality scene.

The processing module 1003 may be further configured to receive an image sequence and an image timestamp sequence sent by the augmented reality processing device, obtain a time value of a current moment, and delete, in a case that a target timestamp exists in the received image timestamp sequence, an image frame corresponding to the target timestamp from the image sequence. The target timestamp may include a timestamp, a difference between which and the time value of the current moment is greater than twice an image display refreshing period of the display device in the image timestamp sequence.

Here, the AR processing device may be separated from the AR display device, and the user only needs to carry a light AR display device with a display function, such as AR glasses and the like, thereby preventing a problem that AR glasses are relatively cumbersome because the conventional AR glasses are required to carry a camera. In addition, the AR display device may suitably discard a part of data from the received to-be-displayed virtual information, implement smooth processing quickly, and further prevent lagging and freezing.

Figure 11:
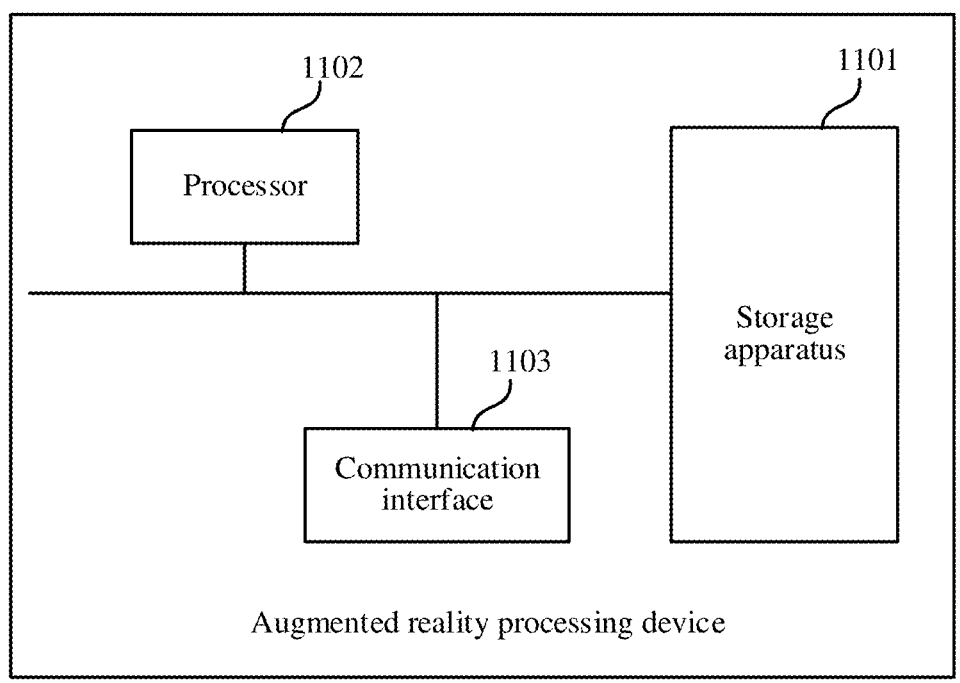
FIG. 11 is a schematic structural diagram of an augmented reality processing device according to an embodiment.

FIG. 11 is a schematic structural diagram of an augmented reality processing device according to an embodiment. The augmented reality processing device of this embodiment may be a computing device, such as a server, and may include a structure, such as a power supply apparatus, a heat dissipation apparatus. Furthermore, the augmented reality processing device may include a storage apparatus 1101, a processor 1102 and a communication interface 1103.

The communication interface 1103 may be a wired interface or a wireless interface. On one hand, the communication interface may receive movement sensing data of the target object in the target site area and that is uploaded by various positioning apparatuses. On the other hand, the communication interface may send the virtual information processed by the processor 1102 to the AR display device in the target site area.

The storage apparatus 1101 may include a volatile memory and a non-volatile memory. The storage apparatus 1101 may further include a combination of the foregoing types of memories.

The processor 1102 may be a central processing unit (CPU). The processor 1102 may further include a hardware chip.

The storage apparatus 1101 may store a computer application instruction. The processor 1102 may invoke the computer application instruction stored in the storage apparatus 1101 to perform the relevant method of the embodiments herein.

According to an embodiment, the processor 1102 may invoke the stored computer application instruction to perform the following operations: obtaining movement sensing data of a target object acquired by a positioning apparatus, the positioning apparatus being configured to monitor the target object located in a target site area; determining, according to the movement sensing data, space motion information of the target object in the target site area, and updating, according to the space motion information, an object model of the target object in a three-dimensional scene model corresponding to the target site area; determining an object position of the updated object model in a target area, the target area being an area determined in the three-dimensional scene model according to position information and field of view information of the display device in the target site area; and displaying virtual information on the display device according to the object position, to display the virtual information in the augmented reality scene.

According to an embodiment, the space motion information may include position information and/or rotation angle information of the target object after moving, and the processor 1102, when configured to update, according to the space motion information, an object model of the target object in a three-dimensional scene model corresponding to the target site area, may be configured to perform the following operations: updating, in a case that the space motion information includes the position information of the target object after moving, a position of the object model of the target object in the three-dimensional scene model according to the position information; and updating, in a case that the space motion information comprises the rotation angle information of the target object after moving, spatial orientation of the object model of the target object in the three-dimensional scene model according to the rotation angle information.

According to an embodiment, the acquisition of position information by a processor 1102 may include performing any one of or a combination of the following operations: obtaining distance data of the target object according to at least two proximity sensors, and determining the position information of the target object in the target site area after the target object moves, the at least two proximity sensors being configured to monitor the target object in the target site area; calculating, according to motion data sensed by a positioning sensor disposed on the target object, the position information of the target object in the target site area after the target object moves; and calculating, according to data sensed by a ground auxiliary positioning apparatus disposed in the target site area, position information of the target object or a partial structure of the target object in the target site area, a height of the target object or the partial structure of the target object from a ground falling within a preset height threshold range.

According to an embodiment, the processor 1102, when performing the obtaining distance data of the target object according to at least two proximity sensors, and determining the position information of the target object in the target site area after the target object moves, may perform the following operations: determining the distance data of the target object obtained by the at least two proximity sensors; obtaining sensor position information of the at least two proximity sensors; and performing least square fitting calculation on the obtained distance data and sensor position information to obtain the position information of the target object in the target site area after the target object moves.

According to an embodiment, the target site area may be further provided with at least two image sensors configured to monitor the target object from different monitoring angles to obtain image data of the target object. The processor 1102 may be configured to update, according to the space motion information, an object model of the target object in a three-dimensional scene model corresponding to the target site area, and may further perform the following operations: updating, according to the space motion information, the object model of the target object in the three-dimensional scene model corresponding to the target site area to obtain an initially updated object model; and identifying an image object of the target object from an image acquired by the at least two image sensors, and correcting the initially updated object model according to the identified image object to obtain an updated object model of the target object.

According to an embodiment, before performing the obtaining movement sensing data of a target object acquired by a positioning apparatus, the processor 1102 may further perform the following operations: obtaining the position information and the field of view information of the display device in the target site area, the display device being configured to display the virtual information of the augmented reality scene; and determining a user field of view according to the position information and the field of view information, and determining the target area in the established three-dimensional scene model according to the user field of view.

According to an embodiment, when performing the obtaining the position information and the field of view information of the display device in the target site area, the processor 1102 may perform the following operations: receiving the position information obtained after the positioning apparatus locates the display device, wherein the positioning apparatus comprises a positioning sensor disposed on the display device, and/or a proximity sensor that is disposed in the target site area and configured to locate the display device; and receiving the field of view information of the display device sensed by an angle sensor disposed on the display device.

According to an embodiment, when performing the displaying virtual information on the display device according to the object position, the processor 1102 may perform the following operations: determining target virtual information to be displayed on the display device; detecting a blocking relationship between the object model of the target object and the target virtual information according to the object position; determining, in a case that the blocking relationship indicates that the object model of the target object blocks the virtual information, a first area that is blocked in the target virtual information, and obtain first virtual information, where the first virtual information does not include a content corresponding to the first area of the target virtual information; and determining, in a case that the blocking relationship indicates that the object model of the target object does not block a second area of the target virtual information, the second area of the target virtual information, and obtain second virtual information, where the second virtual information includes a content corresponding to the second area of the target virtual information.

According to an embodiment, the processor 1102 may further perform the following operation: sending a display message to the display device, wherein the display message carries the virtual information to be displayed on the display device, and may be configured to instruct the display device to display the carried virtual information to overlay-display the virtual information in the target area covered by the user field of view to complete the displaying of the augmented reality scene.

The embodiments of the present disclosure may monitor a moving object in a specific range of a site area, update an object model of the moving object in a three-dimensional scene model corresponding to the site area in time after the object moves, generate, according to the updated three-dimensional scene model, virtual information to be displayed by a display device, and implement, in combination with a real site area seen through the display device, displaying an augmented reality scene. The method does not require a complex image analysis recognition algorithm to determine a display position of the virtual information, and calculation is quick and easy, thereby improving efficiency of implementing an augmented reality scene.

Figure 12:
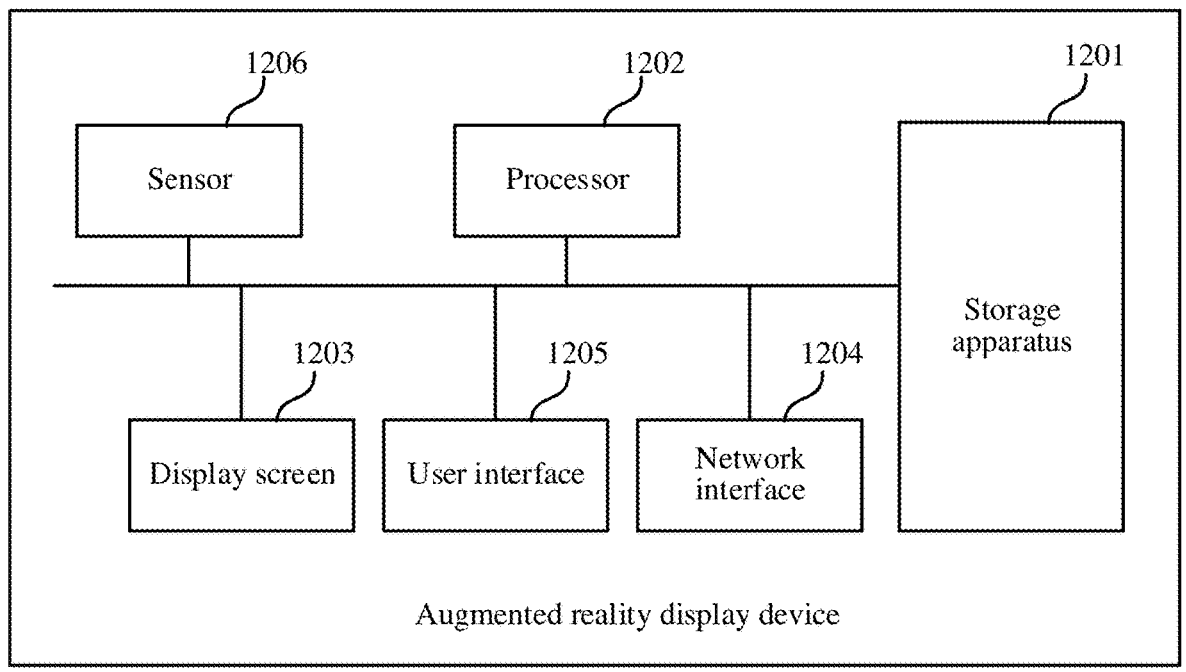
FIG. 12 is a schematic structural diagram of an augmented reality display device according to an embodiment.

FIG. 12 is a schematic structural diagram of an augmented reality display device according to an embodiment. The augmented reality display device may be a computing device that may display virtual information of an augmented reality scene. This device may include a structure, such as a power supply apparatus, a heat dissipation apparatus and the like. In an embodiment, the display device may be AR glasses. The shape of this device may be as shown in FIG. 2, but the shape of the device is not limited thereto. The augmented reality display device may include a storage apparatus 1201, a processor 1202, a display screen 1203, a network interface 1204, a user interface 1205, and a sensor 1206.

The display screen 1203 may be a transparent display screen. Through the transparent display screen 1203, a real object in the real word may be seen and the virtual information may be displayed in the augmented reality scene. The display screen 1203 may be a display screen 1203 made of an organic light-emitting diode (OLED) material.

The network interface 1204 may be configured to receive the virtual information transmitted by an augmented reality processing device. The movement sensing data of the augmented reality processing device, for example, the position information and the field of view information may be transmitted to the display device through the network interface 1204. The position information and the field of view information may be calculated and obtained based on the data collected by the sensor 1206, such as an acceleration sensor and an angle sensor, for example, a gyroscope, disposed in the augmented reality display device.

The user interface 1205 may include a physical button, touch pad or some structures which may sense user's gesture, and may be configured to receive some user's control instructions.

The storage apparatus 1201 may include a volatile memory and a non-volatile memory. The storage apparatus 1201 may further include a combination of the foregoing types of memories.

The processor 1202 may be a central processing unit (CPU). The processor 1202 may further include a hardware chip.

The storage apparatus 1201 may store a computer application instruction. The processor 1202 may invoke the computer application instruction stored in the storage apparatus 1201 to perform the relevant method of the embodiments herein.

The processor 1202 may invoke the stored computer application instruction to perform the following operations: obtaining the position information and the field of view information of the display device in the target site area, the display device being configured to display the virtual information of the augmented reality scene; generating orientation indication information carrying the position information and the field of view information, and sending the orientation indication information to the augmented reality processing device, the orientation indication information being used to indicate the virtual information that is generated by the augmented reality processing device and that is to be displayed in the user field of view determined by the position information and the field of view information; and receiving a display message that is sent by the augmented reality processing device and that carries the virtual information, and displaying the virtual information according to the display message to overlay-display the virtual information in the user field of view to complete the displaying of the augmented reality scene.

When performing the receiving a display message that is sent by the augmented reality processing device and that carries the virtual information, the processor 1202 may be configured to perform the following operations: receiving an image sequence and an image timestamp sequence sent by the augmented reality processing device; obtaining a time value of a current moment; and deleting, in a case that a target timestamp exists in the received image timestamp sequence, an image frame corresponding to the target timestamp from the image sequence. Here, the target timestamp may include a timestamp, a difference between which and the time value of the current moment is greater than twice an image display refreshing period of the display device in the image timestamp sequence.

Here, the AR processing device may be separated from the AR display device, and the user only needs to carry a light AR display device with a display function, such as AR glasses and the like, thereby preventing a problem that AR glasses are relatively cumbersome because the conventional AR glasses are required to carry a camera. In addition, the AR display device may suitably discard a part of data from the received to-be-displayed virtual information, implement smooth processing quickly, and further prevent lagging and freezing.

Figure 13:
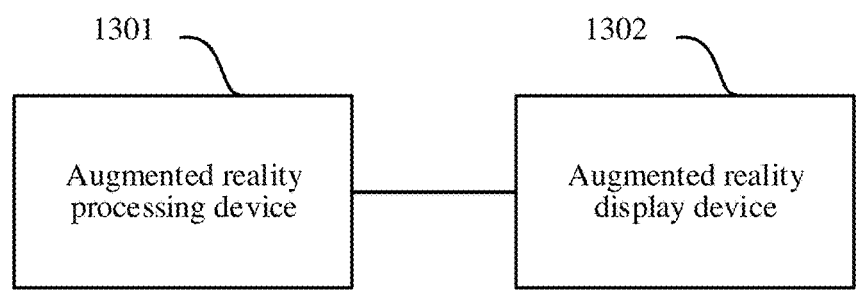
FIG. 13 is a schematic structural diagram of a system for implementing an augmented reality scene according to an embodiment.

The embodiments of the present disclosure further provide a system for implementing an augmented reality scene, as shown in FIG. 13. The system may include an augmented reality processing device 1301 and an augmented reality display device 1302. The augmented reality processing device 1301 may be a server, and the augmented reality display device 1302 may be a display device which may display the virtual information of the augmented reality scene. The display device may be a pair of AR glasses, and the shape of the device is shown in FIG. 2.

The augmented reality processing device 1301 may be configured to obtain movement sensing data of a target object acquired by a positioning apparatus, and the positioning device may be configured to monitor the target object located in a target site area; determine, according to the movement sensing data, space motion information of the target object in the target site area, and update, according to the space motion information, an object model of the target object in a three-dimensional scene model corresponding to the target site area; determine an object position of the updated object model in a target area, the target area being an area determined in the three-dimensional scene model according to position information and field of view information of the display device in the target site area; and displaying virtual information on the display device according to the object position.

The augmented reality display device 1302 may be configured to obtain the position information and the field of view information of the display device in the target site area. The display device may be configured to display the virtual information of the augmented reality scene, generate orientation indication information carrying the position information and the field of view information, and send the orientation indication information to the augmented reality processing device, the orientation indication information being used to indicate the virtual information that is generated by the augmented reality processing device and that is to be displayed in the user field of view determined by the position information and the field of view information; and receive a display message that is sent by the augmented reality processing device and that carries the virtual information, and display the virtual information according to the display message, to overlay-display the virtual information in the user field of view to complete displaying of the augmented reality scene.

According to the embodiments of the disclosure, the AR processing device may be separated from the AR display device, and the user only needs to carry a light AR display device with a display function, such as AR glasses and the like, thereby preventing a problem that AR glasses are relatively cumbersome because the conventional AR glasses are required to carry a camera. In addition, the AR display device may suitably discard a part of data from the received to-be-displayed virtual information, implement smooth processing quickly, and further prevent lagging and freezing.

A person of ordinary skill in this art may understand that, all or some procedures in the methods in the foregoing embodiments may be implemented by a program instructing related hardware. The program may be stored in a computer readable storage medium. When being executed, the program may include the procedures according to the embodiments of the foregoing methods. The storage medium may be a magnetic disk, an optical disc, a read-only memory (ROM), a random access memory (RAM), or the like.

The foregoing descriptions are merely some embodiments of the disclosure, and are not intended to limit the scope of the disclosure. A person of ordinary skill in the art may understand all or some processes of the foregoing embodiments, and equivalent modifications made according to the embodiments of the disclosure shall still fall within the scope of the disclosure.

What is claimed is:

1. A method for implementing an augmented reality scene, executed by a computing device, the method comprising:

obtaining movement sensing data of a target object acquired by a positioning apparatus, the positioning apparatus being configured to monitor the target object in a target site area;

obtaining position information and field of view information of a display device in the target site area from the display device;

determining, based on the movement sensing data of the target object, space motion information of the target object in the target site area;

updating, based on the space motion information, an object model of the target object in a three-dimensional scene model corresponding to the target site area to obtain a first updated object model of the target object; and determining an object position of the first updated object model in a target area and transmitting, to the display device, virtual information according to the object position of the first updated object model relative to the field of view information of the display device, the target area being an area determined in the three-dimensional scene model based on the position information and the field of view information of the display device in the target site area, wherein the target site area comprises at least two positioning apparatuses configured to monitor the target object from different locations and angles to obtain image data of the target object, wherein the updating the object model of the target object in the three-dimensional scene model further comprises identifying an image object of the target object from images acquired by the at least two positioning apparatuses, and correcting the first updated object model according to the identified image object to obtain a second updated object model of the target object, and wherein the determining the object position further comprises determining a height of the target object based on data sensed by a ground auxiliary positioning apparatus disposed on a ground in the target site area, and the data sensed by the ground auxiliary positioning apparatus being different from data sensed by the at least two positioning apparatuses.

2. The method according to claim 1, wherein the space motion information comprises at least one of position information and rotation angle information of the target object, and wherein the method further comprises:

based on the space motion information including the position information of the target object in the three-dimensional scene model, updating the object position of the object model of the target object in the three-dimensional scene model according to the position information; and based on the space motion information including the rotation angle information of the target object, updating spatial orientation of the object model of the target object in the three-dimensional scene model according to the rotation angle information.

3. The method according to claim 2, wherein the method further comprises:

obtaining distance data of the target object according to at least two proximity sensors configured to monitor the target object, and determining the position of the target object in the target site area after the target object moves;

determining, according to motion data sensed by a positioning sensor disposed on the target object, the position of the target object in the target site area after the target object moves; and determining, according to the data sensed by the ground auxiliary positioning apparatus, at least one of the position of the target object, a position of a partial structure of the target object in the target site area, or a height of the partial structure of the target object falling within a preset height threshold range.

4. The method according to claim 3, wherein the obtaining distance data of the target object and determining the position of the target object further comprise:

obtaining sensor position information of the at least two proximity sensors; and performing least square fitting calculation on the obtained distance data and the sensor position information to obtain the position of the target object in the target site area.

5. The method according to claim 1, wherein the obtaining the position information and the field of view information of the display device in the target site area comprises:

receiving the position information after the positioning apparatus locates the display device, the positioning apparatus comprising at least one of a positioning sensor disposed on the display device and a proximity sensor disposed in the target site area; and receiving the field of view information of the display device sensed by an angle sensor disposed on the display device.

6. The method according to claim 1, wherein the determining the object position of the first updated object model in the target area further comprises:

determining a target virtual object to be displayed on the display device;

detecting a blocking relationship between the object model of the target object and the target virtual object;

based on the blocking relationship indicating that the object model of the target object blocks the target virtual object, determining a first area that is blocked and obtaining first virtual information, wherein the first virtual information does not overlap in the first area; and based on the blocking relationship indicating that the object model of the target object does not block the target virtual object, determining a second area and obtaining second virtual information corresponding to the second area.

7. The method according to claim 1, further comprising:

sending a display message to the display device, wherein the display message includes the virtual information to be overlaid in the field of view of the display device.

8. A non-transitory computer storage medium, storing executable instructions, the executable instructions capable of causing a computer to perform the method for implementing the augmented reality scene according to claim 1.

9. A method for implementing an augmented reality scene, executed by a display device, the method comprising:

obtaining position information and field of view information of the display device in a target site area, the display device being configured to display virtual information of the augmented reality scene;

generating orientation indication information based on the position information and the field of view information, and transmitting the orientation indication information to an augmented reality processing device, the orientation indication information instructing the augmented reality processing device to generate the virtual information to be displayed according to a field of view determined by the position information and the field of view information; and receiving a display message including the virtual information, from the augmented reality processing device, and displaying the virtual information based on the display message, the display message instructing the display device to overlay the virtual information in the field of view, wherein the target site area comprises at least two image sensors configured to monitor a target object from different locations and angles to obtain image data of the target object, and a ground auxiliary positioning apparatus configured to determine a height of the target object based on data sensed by the ground auxiliary positioning apparatus disposed on a ground in the target site area, and the data sensed by the ground auxiliary positioning apparatus being different from data sensed by the at least two positioning apparatuses, and wherein the virtual information of the display message includes an object model of the target object that is updated based images of the target object acquired by the at least two image sensors.

10. The method according to claim 9, wherein the receiving the display message including the virtual information further comprises:

receiving an image sequence and an image timestamp sequence from the augmented reality processing device;

obtaining a time value at a current moment; and based on detecting a target timestamp in the received image timestamp sequence, deleting an image frame corresponding to the target timestamp from the image sequence, wherein the target timestamp is a difference between a timestamp and the time value of the current moment, the difference being greater than twice an image display refresh period of the display device, in the image timestamp sequence.

11. An augmented reality display device, comprising: a storage apparatus and a processor, the storage apparatus storing a computer program, and
the processor being configured to invoke the computer program stored in the storage apparatus, to perform the method according to claim 9.

12. A non-transitory computer storage medium, storing executable instructions, the executable instructions capable of causing a computer to perform the method for implementing the augmented reality scene according to claim 9.

13. An augmented reality processing device, comprising:

at least one memory configured to store computer program code; and at least one processor configured to access the computer program code and operate as instructed by the computer program code, the computer program code comprising:

obtaining code configured to cause the at least one processor to obtain movement sensing data of a target object acquired by a positioning apparatus, the positioning apparatus being configured to monitor the target object in a target site area, and obtain position information and field of view information of a display device in the target site area from the display device;

model update code configured to cause the at least one processor to determine, based on the movement sensing data of the target object, space motion information of the target object in the target site area, and update, based on the space motion information, an object model of the target object in a three-dimensional scene model corresponding to the target site area to obtain a first updated object model of the target object; and determining code configured to cause the at least one processor to determine an object position of the first updated object model in a target area, and transmit, to the display device, virtual information according to the object position of the first updated object model relative to the field of view information of the display device, the target area being an area determined in the three-dimensional scene model according to the position information and the field of view information of the display device in the target site area, wherein the target site area comprises at least two positioning apparatuses configured to monitor the target object from different locations and angles to obtain image data of the target object, wherein the model update code is further configured to cause the at least one processor to identify an image object of the target object from images acquired by the at least two positioning apparatuses, and correcting the first updated object model according to the identified image object to obtain a second updated object model of the target object, and wherein the determining code is further configured to cause the at least one processor to determine a height of the target object based on data sensed by a ground auxiliary positioning apparatus disposed on a ground in the target site area, and the data sensed by the ground auxiliary positioning apparatus being different from data sensed by the at least two positioning apparatuses.

14. The augmented reality display device according to claim 13, wherein the spatial motion information comprises at least one of the position information and rotation angle information of the target object; and wherein the model update code is further configured to cause the at least one processor to:

based on the space motion information including the position information of the target object, update the object position of the object model of the target object in the three-dimensional scene model according to the position information; and based on the space motion information including the rotation angle information of the target object, update spatial orientation of the object model of the target object in the three-dimensional scene model according to the rotation angle information.

15. The augmented reality display device according to claim 14, wherein the obtaining code is further configured to cause the at least one processor to:

obtain distance data of the target object according to at least two proximity sensors configured to monitor the target object, and determine the position of the target object in the target site area after the target object moves;

determine, according to motion data sensed by a positioning sensor disposed on the target object, the position of the target object in the target site area after the target object moves; and determine, according to the data sensed by the ground auxiliary positioning apparatus, at least one of the position of the target object, a position of a partial structure of the target object in the target site area, or a height of the partial structure of the target object falling within a preset height threshold range.

16. The augmented reality display device according to claim 15, wherein the obtaining code is further configured to cause the at least one processor to:
  obtain sensor position information of the at least two proximity sensors; and
  performing least square fitting calculation on the obtained distance data and sensor position information to obtain the position of the target object in the target site area.

\* \* \* \* \*